United States Patent [19]

Stern et al.

[11] Patent Number: 4,799,253

[45] Date of Patent: Jan. 17, 1989

[54] COLOCATED CELLULAR RADIOTELEPHONE SYSTEMS

[75] Inventors: Morton Stern, Skokie; James Williams, Lombard, both of Ill.

[73] Assignee: Motorola, Inc., Schaumburg, Ill.

[21] Appl. No.: 75,914

[22] Filed: Jul. 20, 1987

[51] Int. Cl.⁴ .............................................. H04Q 7/04
[52] U.S. Cl. ........................................ 379/59; 455/33
[58] Field of Search ...................... 455/33, 32, 54, 56, 455/58; 379/60, 63, 59

[56] References Cited

U.S. PATENT DOCUMENTS

| | | | |
|---|---|---|---|
| 3,906,166 | 9/1975 | Cooper et al. | 379/60 |
| 4,144,411 | 3/1979 | Frenkiel | 379/60 |
| 4,268,722 | 5/1981 | Little et al. | 379/60 |
| 4,485,486 | 11/1984 | Webb et al. | 455/33 |
| 4,528,656 | 7/1985 | Morais . | |
| 4,669,107 | 4/1986 | Eriksson-Lennartsson | 370/60 |
| 4,680,786 | 7/1987 | Baker et al. | 379/60 |
| 4,698,839 | 10/1987 | DeVaney et al. | 379/60 |
| 4,723,266 | 2/1988 | Perry | 379/60 |
| 4,727,590 | 2/1988 | Kawano | 455/33 |
| 4,730,310 | 3/1988 | Acampora et al. | 370/95 |
| 4,737,978 | 4/1988 | Burke et al. | 379/60 |
| 4,750,198 | 6/1988 | Harper | 379/59 |

Primary Examiner—Robert Lev
Attorney, Agent, or Firm—Rolland R. Hackbart

[57] ABSTRACT

An existing cellular system (X-system 102) is interconnected with another cellular system (M-system 101) via inter-office trunks (150) to add additional switching capacity for providing telephone coverage to mobiles located throughout their common coverage area. X-system (102) includes a control terminal (102) coupled by data and voice lines to base sites (121-124) and by out trunks to a telephone central office (110). M-system (101) includes a control terminal (420) coupled by data and voice lines to base sites (411-415) and by in trunks and out trunks to the telephone central office (110). M-system base sites (411-414) are colocated with corresponding existing X-system base sites (121-124). Paging/access channels are assigned to M-system base sites (411-414) for processing all incoming originations from mobiles and paging mobiles for all outgoing originations. Access-only channels are assigned to X-system base sites (121-124) for processing mobile originations transferred to X-system (102) by a directed retry message from M-system (101). M-system (101) shares the mobile origination traffic with X-system (102) by sending a directed retry message to a percentage of the originating mobiles.

13 Claims, 16 Drawing Sheets

FIG. 5
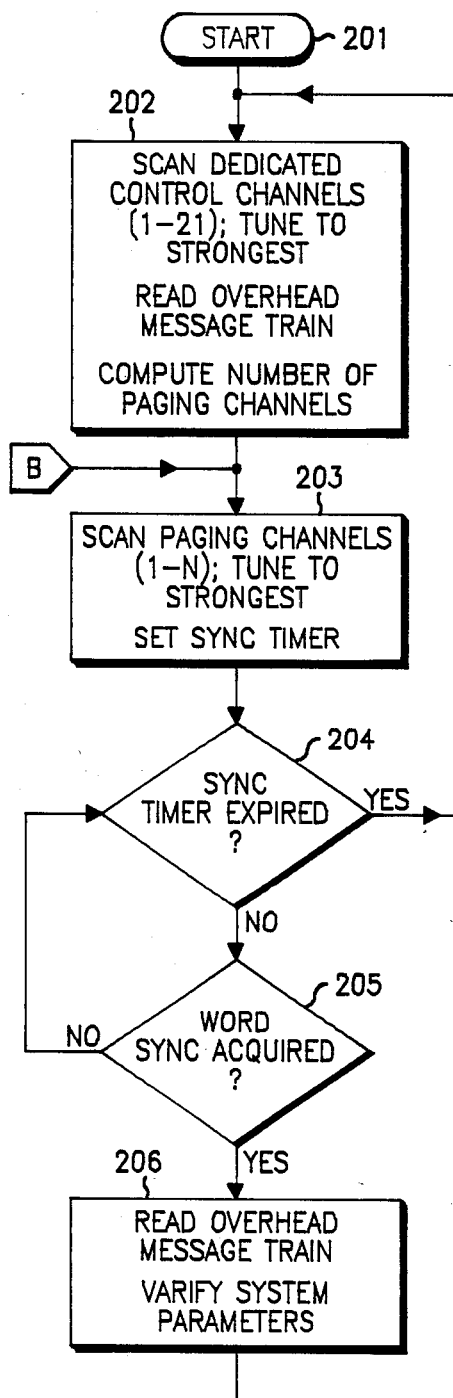
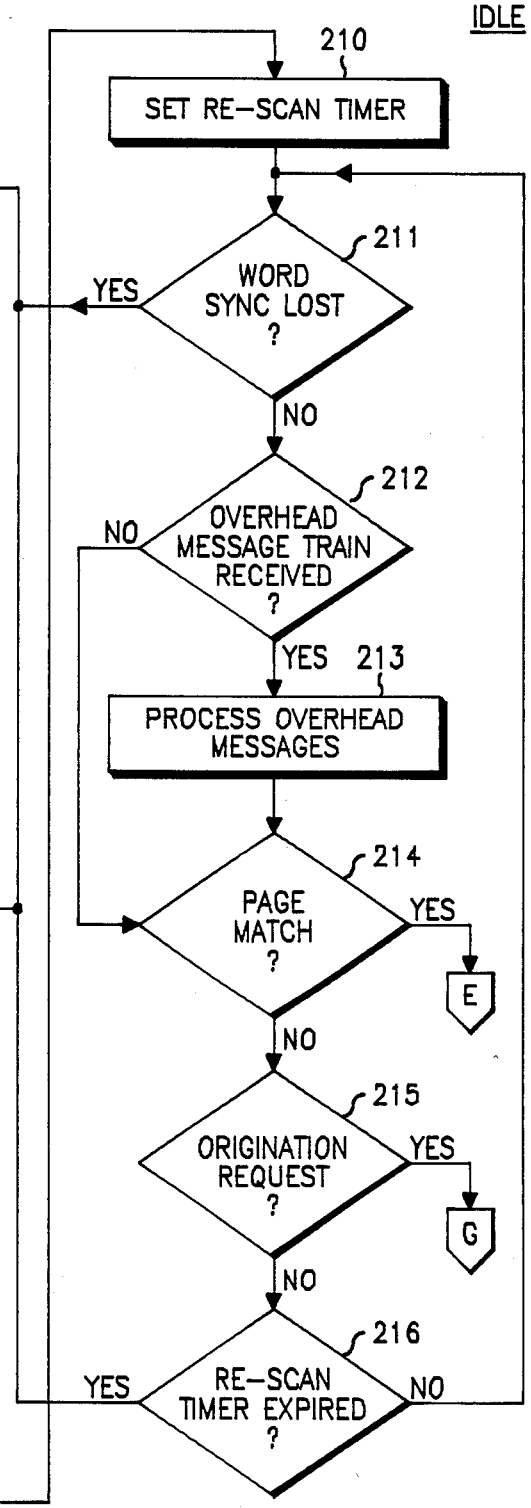

PAGE RESPONSE ACCESS

MOBILE ORIGINATION ACCESS

M-SYSTEM BASE SITE CONTROLLER

SUBROUTINE M-DISCONNECT

SUBROUTINE X-TERMINATE

1300 OVERHEAD MESSAGE TRAIN
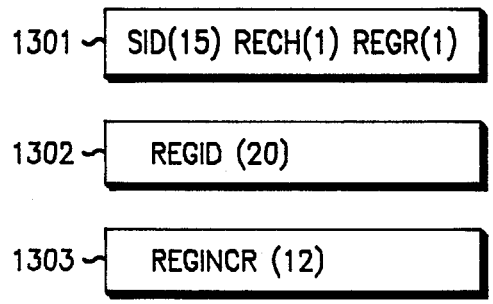
FIG. 14
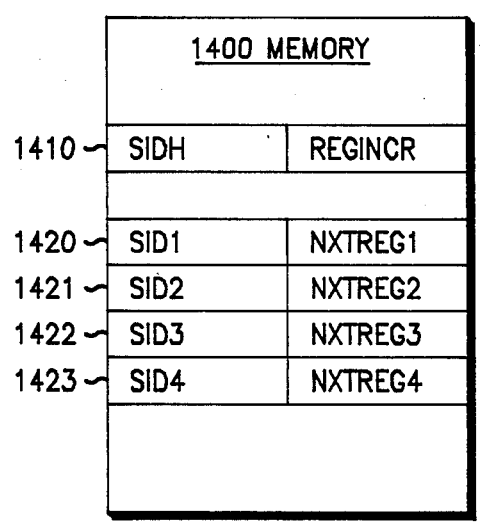
FIG. 15
FIG. 16
1500 DIRECTED RETRY MESSAGE
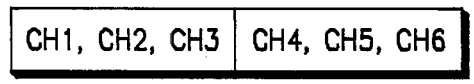

COLOCATED CELLULAR RADIOTELEPHONE SYSTEMS

BACKGROUND OF THE INVENTION

The present invention generally relates to radiotelephone communication systems and more specifically to a method and apparatus for interconnecting two or more cellular radiotelephone systems covering the same geographical area.

Mobile radiotelephone service has been in use for some time and traditionally has been characterized by a central site transmitting by way of high-power transmitters to a limited number of mobile or portable radiotelephones in a large geographic area. To avoid repetition, the word "mobile" will be used hereinafter to mean mobile and/or portable radiotelephones. Mobile transmissions, due to their lower power transmitters, were generally received in previous systems by a network of satellite receivers remotely located from the central site for receiving and relaying mobile transmissions to the central site for processing. In previous systems only a limited number of radio channels were available, thus limiting the number of radiotelephone conversations in an entire city to the specific number of available channels.

Modern cellular radiotelephone systems have a comparatively large number of radio channels available which, further, can be effectively multiplied by reuse of the radio channels in a geographical area, such as the metropolitan area of a large city like Chicago or New York, by dividing the radio coverage area into smaller coverage areas called "cells" using low power transmitters and coverage restricted receivers. Such cellular systems are further described in U.S. Pat. Nos. 3,906,166 and 4,268,722. The limited coverage area enables the radio channels used in one cell to be reused in another cell geographically separated according to a predetermined plan, such as a four cell pattern shown and described in U.S. Pat. No. 4,128,740. In this four cell pattern, each cell is assigned a subset of the available radio channels and reuse of the radio channels is accomplished by repeating the pattern throughout a geographical area.

A cellular system typically utilizes a pair of radio frequencies for each radio channel in each cell. Each cell is assigned at least one paging/access channel and several voice channels The paging/access channel is dedicated to controlling the operation of the mobiles by means of data messages transmitted to and received from the mobiles. Control functions performed include paging selected mobiles, receiving requests for service from mobiles, instructing mobiles to tune to a voice channel where a conversation may take place, identifying the particular system to the mobiles, and enabling mobile registration by which process the mobiles identify themselves to the system. The data message and radio channel specifications for U.S. cellular radiotelephone systems are set forth in Electronic Industries Association (EIA) Interim Standard IS-3 implemented in accordance with 47 CFR 22 and the Report and Orders pertaining to Federal Communications Commission Docket 79-318. Copies of EIA Interim Standard IS-3 may be obtained from the Engineering Department of the Electronic Industries Association at 2001 Eye Street, N.W., Washington, D.C. U.S.A. 20006.

A cellular system can grow by adding more voice channels to existing cells, subdividing existing cells into smaller cells and adding new cells until the call switching capacity of the cellular system control terminal is consumed, or until the traffic density limit inherent in the particular frequency re-use pattern is reached. At that point, additional switching capacity is required for further growth, or a different frequency re-use pattern must be adopted. When the original equipment manufacturer for the system is unable to supply switching equipment with higher capacity or a frequency re-use pattern with a higher inherent density, the only recourse is to incorporate equipment from a different manufacturer or to curtail further growth. Since signalling protocols between cells and the cellular system control terminal are proprietary to each equipment manufacturer, growth by interconnection of different manufacturers' control terminal equipment and cell equipment is not possible. Accordingly, there is a need for an improved method and apparatus for interconnecting two or more cellular system covering the same geographical area in order to accommodate cellular system growth, or to allow graceful transition to equipment supplied by a different manufacturer which may offer more useful performance or other characteristics.

SUMMARY OF THE INVENTION

Therefore, it is an object of the present invention to provide an improved method and apparatus for interconnecting cellular systems covering the same geographical area in order to accommodate cellular system growth.

It is a further object of the present invention to provide an improved method and apparatus for sharing the radiotelephone traffic load between interconnected cellular systems covering the same geographical area.

Briefly described, the present invention encompasses an improved method of processing radiotelephone calls in at least first and second radiotelephone systems coupled to a central office for providing telephone service to radiotelephones located in the same geographical area. The geographical area is divided into a plurality of cells each assigned a plurality of voice radio channels, at least one paging/access radio channel and/or at least one access-only radio channel which differ from those radio channels assigned to adjoining cells. The first radiotelephone system including a plurality of inter-office trunks and fixed site radio apparatus for communicating with said radiotelephones, and the second radiotelephone system including a plurality of in trunks, out trunks, inter-office trunks and fixed site radio apparatus for communicating with said radiotelephones. The novel method comprises the steps of: coupling in trunks and out trunks of said second radiotelephone system to the central office; coupling the said first radiotelephone system to the said second radiotelephone system by means of inter-office trunks using standard channel-associated supervisory signalling and standard multi-frequency address signalling or other equivalent signalling methods accommodated by both said radio telephone systems; locating fixed site radio apparatus of said second radiotelephone system with fixed site radio apparatus of said first radiotelephone system in each cell; assigning the access-only radio channels and at least two of the plurality of the voice radio channels to the fixed site radio apparatus of said first radiotelephone system located therein, and the paging/access radio channels and at least two of the plurality of the voice radio channels to the fixed site radio apparatus of said second radiotelephone system located therein to each cell; arranging the information contained in the data messages transmitted by the fixed site radio apparatus of the said first and second radiotelephone systems on the access-only and the paging/access radio channels, respectively, so that mobile stations in the idle state always monitor the paging/access radio channels controlled by the said second radiotelephone systems; processing all land-originated calls to mobile stations through said second radiotelephone system, transmitting all pages on the paging/access radio channels controlled by said second radiotelephone system; receiving all page responses from mobile stations via the paging/access radio channels and processing those responses in said second radiotelephone system; receiving all mobile-originated calls via the paging/access channels controlled by the said second radiotelephone system; and redirecting a dynamically selectable percentage of telephone calls originated by radiotelephones from said second radiotelephone system to said first radiotelephone system by Way of the access-only radio channels.

BRIEF DESCRIPTION OF THE DRAWINGS

FIG. 5 shows a flow diagram executed by a mobile for scanning the paging/access channels in the cellular systems in FIG. 1.

FIG. 14 shows a diagram of the overhead message train.

FIG. 15 shows a diagram of a portion of the mobile memory.

FIG. 16 shows a diagram of the directed re-try message.

DETAILED DESCRIPTION OF THE PREFERRED EMBODIMENT

Figure 1:
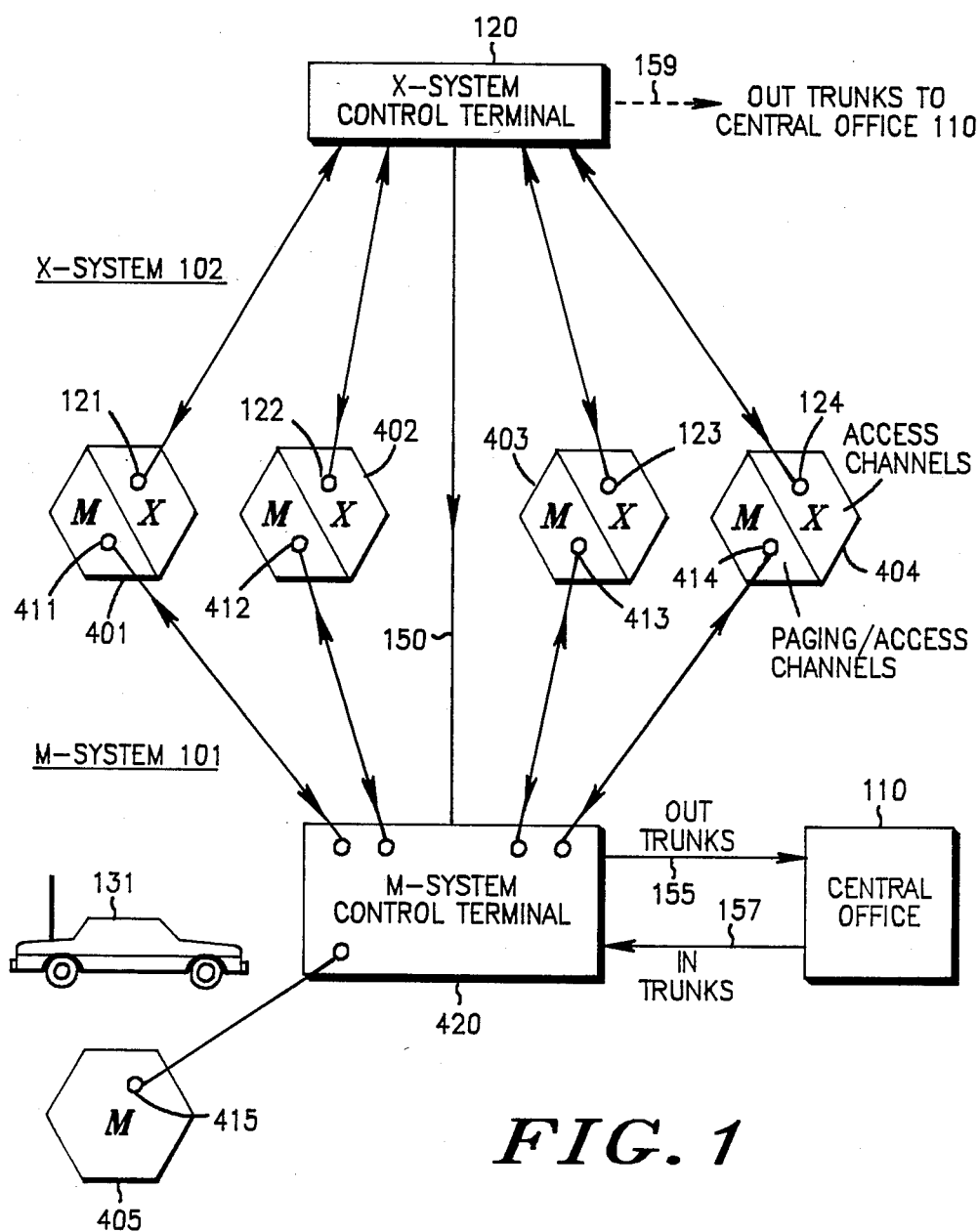
FIG. 1 is a block diagram of two interconnected cellular radiotelephone systems covering substantially the same geographical area.

In FIG. 1, there is illustrated two interconnected cellular systems 101 and 102, each covering the same geographical area, such as the metropolitan area of a large city. Cellular system 102, referred to as X-system, is an existing cellular system which, for purposes of discussion, shall be assumed to be lacking in additional switching capacity for further growth. X-system 102 may be any conventional cellular system currently commercially available from a number of different manufacturers. X-system 102 includes control terminal 120 and illustrative base sites 121–124 in cells 401–404, respectively, for providing telephone service to mobiles 131 in its geographical area. X-system 102 may grow by adding more voice channels to existing cells 401–404, subdividing existing cells 401–404 into smaller cells, and/or adding new cells until the switching capacity of its control terminal is consumed. Further growth is then possible only by adding additional switching capacity, which currently may be implemented only by replacing the existing control terminal of the X-system 102 with a control terminal having greater switching capacity at substantial costs in terms of money and cellular service interruptions.

However, by utilizing the present invention, switching capacity may be added to X-system 102 by interconnecting it with another cellular system, such as M-system 101 in FIG. 1. Interconnecting systems 101 and 102 increases available switching capacity, while at the same time, existing control terminal 120 and base sites 121–124 continue to be used, the new M-system can be phased in gradually, and mobile service is not affected and need not be interrupted.

Referring to FIG. 1, M-system 101 includes control terminal 420 and illustrative base sites 411–415 in cells 401–405, respectively, for providing telephone service to radiotelephones in the same geographical area covered by X-system 102. Control terminal 420 of M-system 101 may be located (e.g., colocated on the same or different floors of a building or colocated in adjacent buildings) with control terminal 120 of X-system 102 and interconnected by conventional inter-office trunks 150 using standard channel-associated supervisory signalling and standard multi-frequency address signalling or other equivalent signalling methods accommodated by both systems 101 and 102. Out trunks 159, if used, (conventional telephone trunks) of X-system control terminal 120 are connected to central office 110, and all in trunks of X-system control terminal 120 are disconnected and not used. Out trunks 155 and in trunks 157 of M-system control terminal 420 are connected to central office 110. As a result, all land originations are routed by central office 110 only to M-system control terminal 420.

Base sites 411–414 of M-system 101 in FIG. 1 are located With or adjacent to corresponding existing base sites 121–124 of X-system 102. That is, for example, base site 411 of M-system 101 may be colocated with base site 121 of X-system 102 for covering cell 401. New cells may be added by means of additional base sites, such as base site 415, which are connected only to M-system control terminal 420. A previously explained, each cell is assigned at least one paging/access channel and several voice channels. In U.S. cellular systems, twenty-one channels have been reserved for paging/access channels. For the interconnected systems 101 and 102 in FIG. 1, nine paging/access channels may be assigned to base sites 121–124 of X-system 102 and nine paging/access channels may be assigned to base sites 411–415 of M-system 101 (having three paging/access channels unused) where a nine cell pattern of channel reuse is adopted (see U.S. Pat. No. 4,128,740 for an explanation of re-use of channels in cellular systems).

Mobiles identify the paging/access channels (see FIG. 5) by reading the overhead message train (see FIG. 14) received from the strongest of the twenty-one channels.

In the interconnected systems 101 and 102 in FIG. 1, the assignment of paging/access channels is further characterized in that, according to the present invention, the nine channels assigned to base sites 121–124 of X-system 102 are access-only channels, and the nine channels assigned to to base sites 411–415 of M-system 101 are paging/access channels. As a result, all mobile originations are made to base sites 411–415 of M-system 101. M-system 101 process all mobile originations and transfers a percentage of the mobile originations to X-system 102 by sending a directed retry message to the originating mobile. The percentage of calls transferred by M-system 101 to X-system 102 can be preselected to provide X-system 102 with a desired traffic load or may be dynamically varied depending on parameters selected by the system operator and the actual traffic load of both systems 101 and 102. Upon receipt of the directed retry message, the originating mobile scans and selects one of the nine access-only channels of base sites 121–124. As a result of this unique operating mode of systems 101 and 102, all incoming traffic from central office 110 is processed by M-system 101 and the outgoing traffic from mobiles is split between them M-system 101 and X-system 102.

The operation of interconnected systems 101 and 102 can be summarized by the following process steps which take place during mobile turn on, land originations and mobile originations. When the mobile is first turned on, all twenty-one paging/access channels are scanned and the strongest is selected. The overhead message train (see FIG. 14) transmitted on the selected paging/access channel is read and used to obtain the channel numbers of the paging channels, which will be the paging/access channels of base sites 411–415. The mobile then scans the paging channels, selects the strongest paging channel and reads the overhead message thereon. The overhead message on the strongest paging channel is used to obtain the channel numbers of the access channels, which again will be the paging/access channels of base sites 411–415. Thus, for paging and access purposes, mobiles will always use the paging/access channels of base sites 411–415 in M-system 101. The foregoing process is described in more detail hereinbelow with respect to FIGS. 5 and 6.

For land originations, an incoming call is routed via in trunks by central office 110 to M-system control terminal 420. The dialed digits of the incoming call are received and translated by M-system control terminal. The translated mobile number corresponding to the dialed digits is validated in the subscriber data base and the mobile is paged in all cells. If the mobile receives the page, it responds on a paging/access channel of one of the base sites 411–415. The foregoing process is described in more detail hereinbelow with respect to FIGS. 8–10.

Mobile originations may result in a land termination or a mobile termination. For mobile originations, a mobile selects a paging/access channel of M-system base sites 411–415. According to the present invention, M-system base sites 411–415 transfer a dynamically selected percentage of the mobile originations to X-system 102 as shown in FIG. 7. If the mobile origination is not transferred, M-system control terminal 420 may then process the mobile origination as shown is FIGS. 8–10. If the mobile origination is transferred to X-system 102, X-system control terminal 120 may then process the mobile origination as shown is FIGS. 11–13.

Figure 2:
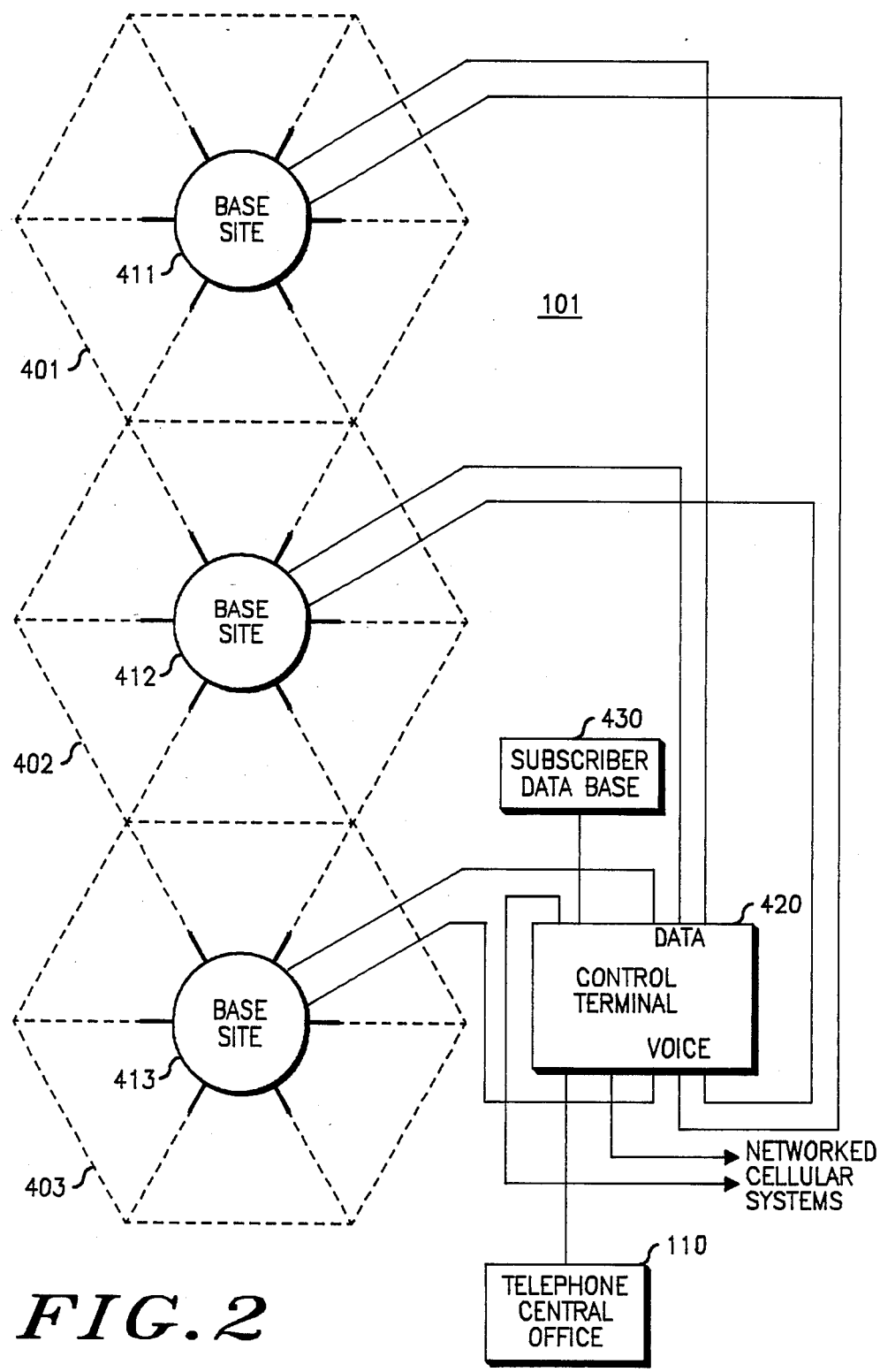
FIG. 2 is a block diagram of the equipment which would be employed in a conventional center illuminated sector cellular system.

Referring now to FIG. 2, there is illustrated a block diagram of cellular system 101 and 102 in FIG. 1. Such cellular systems 101 and 102 are further described in U.S. Pat. Nos. 3,906,166 and 4,268,722 each assigned to the assignee of the present invention and incorporated herein by reference and in an experimental cellular radiotelephone system application filed under FCC Docket No. 18262 With the Federal Communications Commission by Motorola and American Radio-Telephone Service, Inc., in Feb. 1977. Such cellular systems provide telephone coverage to mobiles located throughout a large geographical area, such as the metropolitan area of one or more large cities. Mobiles may be cellular radiotelephones of the type described in U.S. Pat. Nos. 4,486,624, 3,962,553 and 3,906,166 each assigned to the assignee of the present invention and incorporated herein by reference, and in Motorola instruction manual number 68P81039E25, published by Motorola Service Publications, Schaumburg, Ill., in 1979. Mobiles are commercially available in the U.S. from a number of cellular radiotelephone suppliers. Although FIG. 2 shows three center-illuminated sector cells, it is obvious that a person skilled in the art may be able to apply the essence of the present invention to other types of cellular configurations such as, for example, omnidirectional-illuminated or corner-illuminated cellular configurations.

As illustrated in FIG. 2, the geographical area is subdivided into illustrative cells 401–403 which are illuminated with radio frequency energy from base sites 411–413. Each base site 411–413 is coupled by data and voice lines to a radiotelephone control terminal 420 which may be similar to the terminals described in aforementioned U.S. Pat. Nos. 3,906,166 and 4,268,722. These data and voice lines may be provided by dedicated wire lines, pulse code modulated carrier lines, microwave radio channels, or other suitable communication links. Control terminal 420 is, in turn, coupled to the existing telephone network via a conventional telephone central office 110 for completing telephone calls between mobiles and landline telephones. Control terminal 420 may include its own subscriber data base Which includes subscriber identification and billing information or may also be coupled by data lines to a remote subscriber data base 430.

Figure 3:
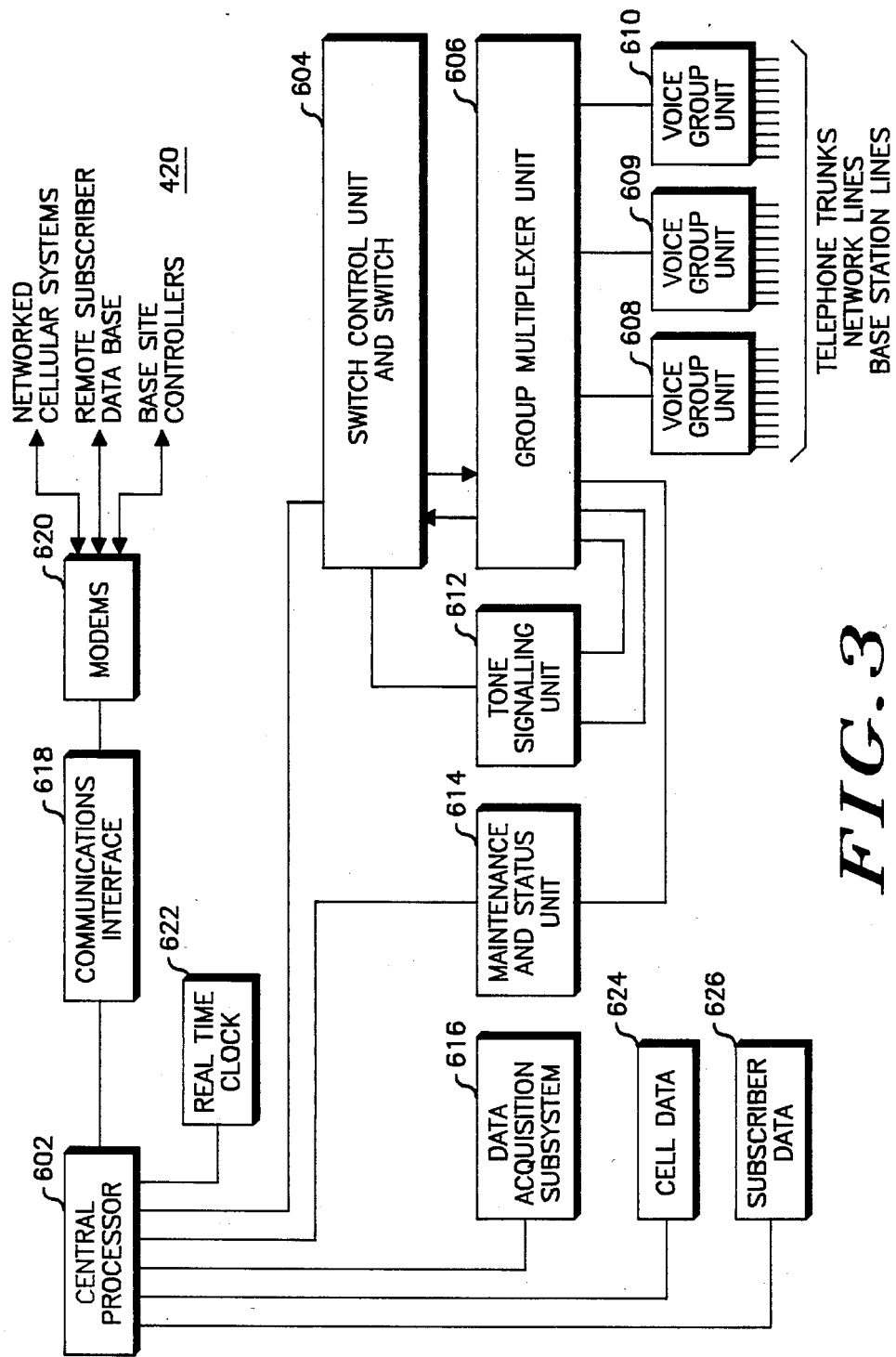
FIG. 3 is a block diagram of the control terminal in FIG. 2.

A functional block diagram of a typical control terminal 420 is shown in FIG. 3. This control terminal may be an EMX 100 available from Motorola, Inc. or any other suitable commercially available equivalent. Basically, the control terminal consists of a central processor (CCP) 602, a switch control unit and switch 604, group multiplexer unit 606, voice group units 608–610, tone signalling unit 612, maintenance and status unit 614, data acquisition subsystem 616, communications interface 618, modems 620, real-time clock 622, cell data base 624 and subscriber data base 626. Cell data base 624 includes data identifying border cells, adjacent cells and lists of paging/access channels for directed retrys. Subscriber data base 626 includes data identifying valid subscriber identification numbers and other subscriber related information. Communications over the data lines to each BSC, cellular system and remote subscriber data base may be accomplished via conventional modems 620 using any conventional communications protocol such as Advanced Data Communications Control Procedures (ADCCp).

Figure 4:
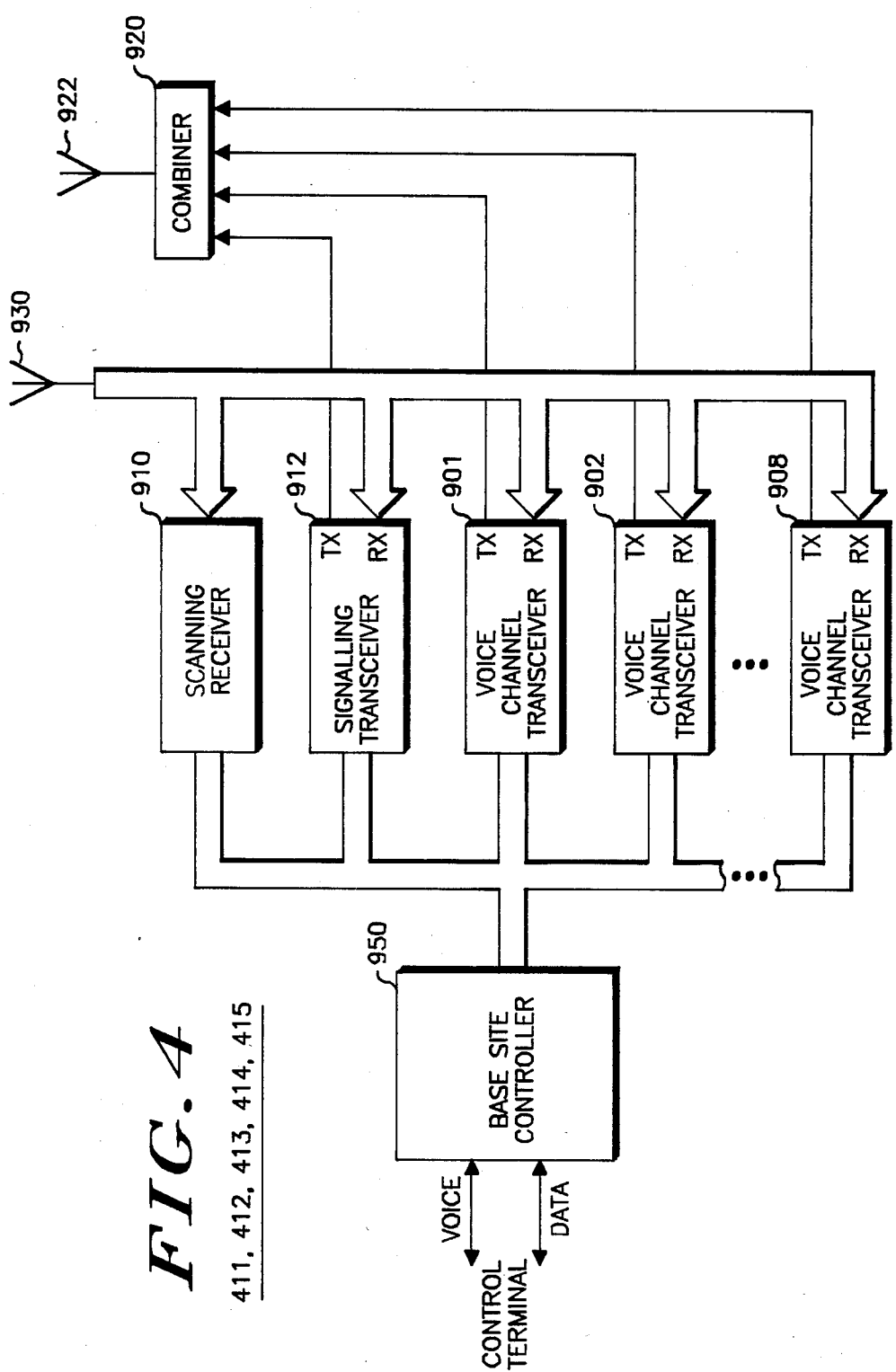
FIG. 4 is a block diagram of the base sites in FIG. 2.

The interconnection between control terminal 420 and the base sites 401–403 is further shown in FIG. 4. The interconnection may be on a line per channel basis or a pulse-code-modulation (PCM) group basis. Either type of interconnection is well known in the art. A separate data line, such as, for example, a standard telephone line or other communications link capable of carrying high-spaced data, is extended between the control terminal 420 and each base site 401–403.

Referring to FIG. 4, each of the base site 411–413 includes a base site controller (BSC) 950, a scanning receiver 910, a signalling transceiver 912 for operating on at least one duplex paging/access channel, a plurality of voice channel transceivers 901–908 for operating on corresponding duplex voice channels, receiving antennas 930, transmitter combiner 920, and transmitter antenna 922. Voice channel transceivers 901–908 may be located substantially at the center of each of the corresponding cells 401–403. The transmitters of signalling transceiver 912 and voice channel transceivers 901–908 may be combined by conventional combiner 920 onto one omni-directional antenna 922, while the signalling receiver 912 and receivers of voice channel transceivers 901–908 and scanning transceiver 910 may be selectively intercoupled to two or more directional or omni-directional antennas 930. Alternatively, in other conventional embodiments, each transmitter of signalling transceiver 912 and voice channel transceivers 901–908 may also be coupled to two or more directional antennas.

Antennas 930 in FIG. 4 may be implemented with six 60° sector antennas. Each sector antenna 930 primarily covers a portion of a cell as shown in dashed lines in FIG. 2 and typically has a coverage area that overlaps the coverage area of adjacent sector antennas. Since the paging/access channel generally requires an omni-directional receiving pattern, the signals received by the six sector antennas 930 may be combined in signalling transceiver 912 by means of a maximal ratio predetection diversity combiner, as illustrated and described in U.S. Pat. Nos. 4,369,520 and 4,519,096 each assigned to the assignee of the present invention and incorporated herein by reference. Furthermore, signalling transceiver 912 may provide coverage of a portion of a cell by selectively combining the signals received by two or more of the sector antennas 930. The sector antennas 930 and associated receiving apparatus may be of the type shown and described in U.S. Pat. Nos. 4,101,836, 4,317,229 and 4,549,311 each assigned to the assignee of the present invention and incorporated herein by reference.

The base site equipment in FIG. 4 and its operation is described in further detail in U.S. Pat. No. 4,485,486; in the instant assignee's copending Pat. application Ser. No. 829,872, filed Feb. 18, 1986, entitled "Method and Apparatus for Signal Strength Measurement and Antenna Selection in Cellular Radiotelephone Systems", invented by Barry J. Menich et al.; in the instant assignees copending patent application Ser. No. 925,427, filed Oct. 31, 1986, entitled "Networked Cellular Radiotelephone Systems" and invented by Michael Burke et al.; and in the instant assignees copending patent application Ser. No. 37,268, filed Apr. 10, 1987, entitled "Registration of Radiotelephones in Networked Cellular Radiotelephone Systems" and invented by James M. Williams; all incorporated herein by reference. Furthermore, the base site equipment illustrated in FIG. 4 is commercially available from Motorola, Inc. and employs transceivers of the type described in Motorola Instruction Manual No. 68P81060E30, published by Motorola Service Publications, 1301 East Algonquin Road, Schaumburg, Ill. in 1982.

Referring to FIG. 5, there is illustrated a flow diagram executed by mobiles for scanning and selecting paging/access channels during initialization and for receiving or initiating calls in cellular systems 101 and 102. The process in FIG. 5 is entered at START block 201 when the mobile is turned on. At block 202, the mobile scans a predesignated group of twenty-one dedicated control channels, which in systems 101 and 102 Will be the paging/access channels of base sites 411–415. The mobile selects and tunes to the selected strongest paging/access channel and reads the overhead message train (OMT) thereon. The overhead words inform the mobile how the system is configured and how the mobile is to use the system. Referring to FIG. 14, the OMT 1300 is transmitted on paging/access channels throughout the cellular system service area, nominally once each second, and include s a system parameter message SID, RECH and REGR 1301 plus, optionally, several other messages of Which the registration ID message REGID 1302 and the re gistration increment message REGINCR 1303 are relevant to the mobile registration process. The mobile registration process is described in more detail in my copending patent application Ser. No. 37,268, entitled "Registration of Radiotelephones in Networked Cellular Radiotelephone Systems", filed on April 10, 1987 and assigned to the instant assignee.

The purpose of registration is to permit calls to a mobile to be automatically delivered, even though the mobile may be moving from place to place through the cellular system. Registration may be enabled or disabled individually for each class of mobile, e.g. home or roam, by means of control bits REGH and REGR in the system parameter overhead message 1301 in FIG. 14. Message 1301 also contains the identification of the serving cellular system (SID) by means of which the mobile determines whether it is a "home" or a "roam" mobile. Each mobile contains, in its internal memory 1400 shown in FIG. 15, an entry 1420 indicating its home cellular system (SIDH) and entries 1420–1423 indicating the four cellular systems (SID1–SID4) in which it most recently registered successfully, along with a value for each cellular system (NXTREG) used to determine when it is scheduled to re-register.

Returning to block 202 in FIG. 5, the mobile computes the number of paging channels. Next, at block 203, the mobile scans and selects the paging channel which has the strongest signal strength. Then, the mobile sets the SYNC timer which establishes a time interval during which word synchronization must be detected. Next, at decision block 204, a check is made to determine on the SYNC timer has expired. If so, YES branch is taken back to block 202 to repeat the scanning proceed. If the SYNC timer has not expired, NO branch is taken from decision block 204 to decision block 205, Where a check is made to determine of WORD SYNC has bee n acquired. If not, NO branch is taken back to decision block 204. If WORD SYNC has be e n acquired, YES branch is taken form decision block 205 to block 206.

At block 206, the mobile reads the overhead message train and verifies system parameters contained therein. The n, at block 210, the RE-SCAN TIMER is set. The RE-SCAN TIMER establishes a time interval during which the overhead message train on the selected paging channel is monitored. Next, at decision block 211, a check is made to determine if WORD SYNC has been lost. If so, YES branch is taken back to block 202 to repeat the scanning process. If WORD SYNC has not be e n lost, NO branch is taken from decision block 211 to decision block 212, where a check is made to determine if the overhead message train has been received If so, YES branch is taken to block 213 to process the overhead messages. If the overhead message train has not been received, NO branch is taken form decision block 212 to block 214.

Figure 6A:
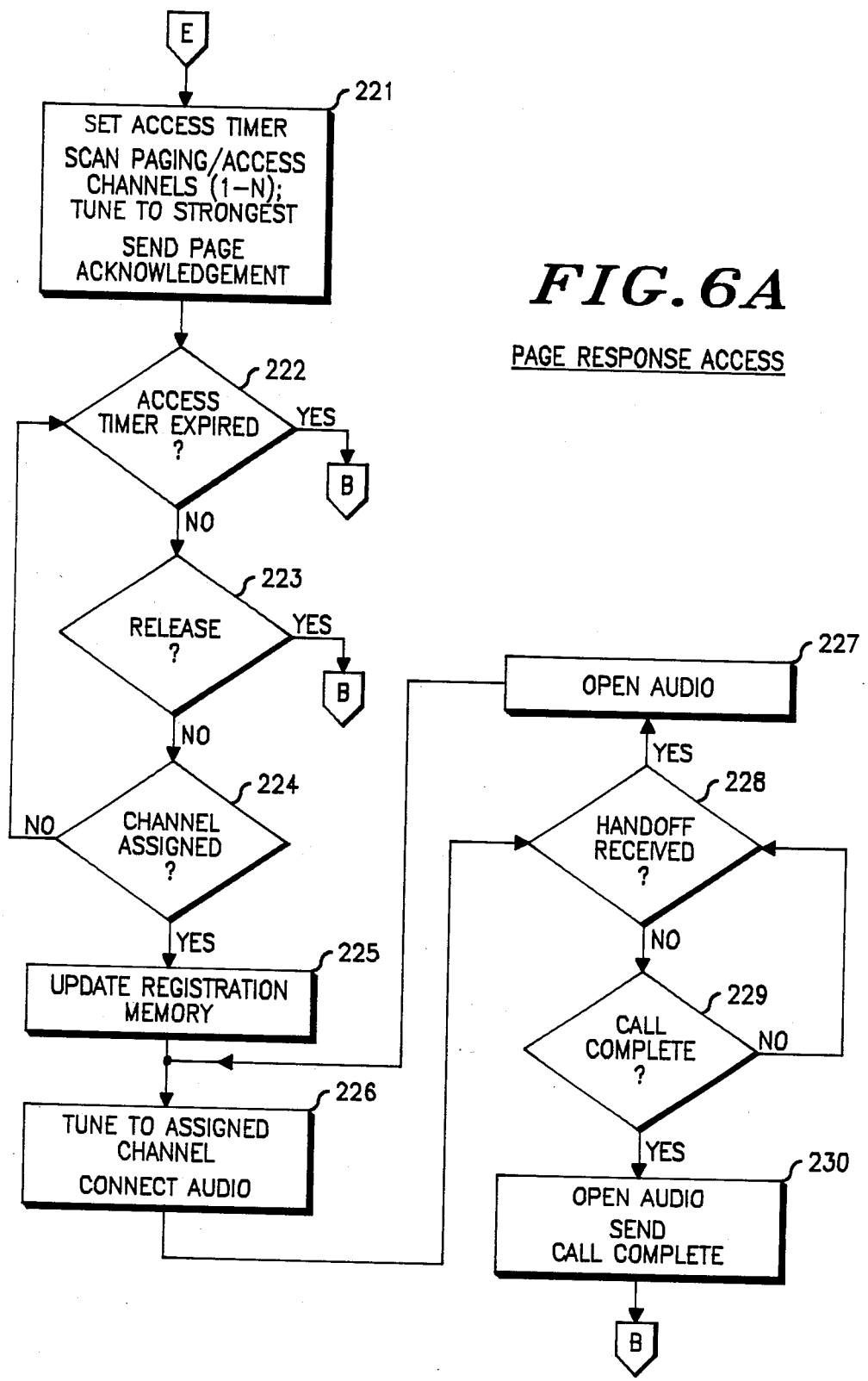
FIGS. 6A and 6B show a flow diagram executed by a mobile for a page response and a flow diagram executed by a mobile for an, origination access, respectively, in the cellular systems in FIG. 1.

At decision block 214, a check is made to determine if a page match has been received If so, YES branch is taken to FIG. 6A to execute the flow diagram for the page response access. If a page match has not been received, NO branch is taken from decision block 214 to decision block 215, where a check is made to determine if an origination request has been made by the mobile . If so, YES branch is taken to FIG. 6B to execute the flow diagram for the origination access. If an origination request has not been made by the mobile, NO branch is taken from decision block 215 to decision block 216, where a check is made to determine if the RE-SCAN TIMER has expired. If not, No branch is taken to decision block 211 to rescan the selected paging channel. If the RE-SCAN TIMER has expired, YES branch is taken from decision block 216 to block 202 to repeat the scanning process.

Referring to FIG. 6A, there is illustrated a flow diagram executed by mobiles for a page response access in cellular systems 101 and 102. The process in FIG. 6A is entered at block 221 Where the access timer is set. Next, the mobile scans the paging/access channels and tunes to the selected strongest paging/access channel. Then, the mobile sends a page acknowledgement message. Next, at decision block 222, a check is made to determine if the ACCESS TIMER has expired. If so, YES branch is taken to block 202 in FIG. 5 to repeat the scanning process.

If the ACCESS TIMER has not expired, NO branch is taken from decision block 222 to decision block 223 where a check is made to determine if a release has been received. If so, YES branch is taken to block 202 in FIG. 5 to repeat the scanning process. If a release has not been received, NO branch is taken from decision block 223 to decision block 224, where a check is made to determine if a voice channel has been assigned. If not, NO branch is taken back to decision block 222. If a voice channel has be e n assigned, YES branch is taken to block 225 where the registration information is updated in the mobile's memory 1400 (see FIG. 15). Next, at block 226, the mobile tunes to the assigned voice channel and connects the audio path.

Proceeding to decision block 228, a check is made to determine if a handoff message has been received. A handoff message is sent to a mobile when it passes from one cell into another. If a handoff message has been received, YES branch is taken to block 227 where the audio path is opened. Next, at block 226, the mobile tunes to the new voice channel received in the handoff message and reconnects the audio path. If a handoff message is not received, NO branch is taken form decision block 228 to decision block 229, where a check is made to determine if the call has been completed. If not, NO branch is taken back to decision block 228. If the call has been completed, YES branch is taken form decision block 229 to block 230 where the audio is opened and a call complete message is sent by the mobile. Thereafter, the mobile returns to block 202 in FIG. 5 to repeat the scanning process.

Figure 6B:
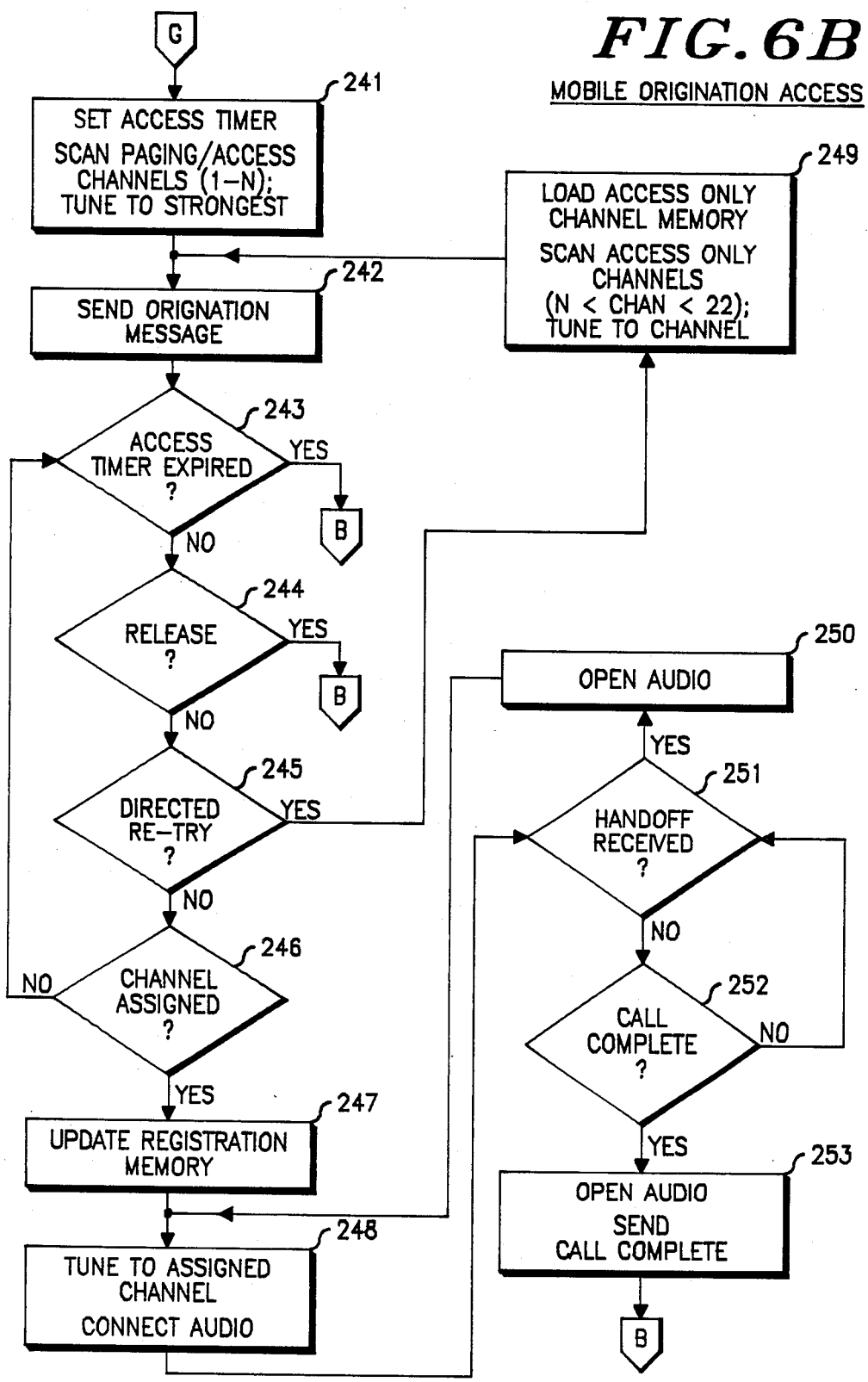

Referring to FIG. 6B, there is illustrated a flow diagram executed by mobiles for an origination access in cellular systems 101 and 102. The process in FIG. 6B is entered at block 241 where the access timer is set. Next, the mobile scans the paging/access channels and tunes to the selected strongest paging/access channel. Then, at block 242, the mobile sends a call origination message. Next, at decision block 243, a check is made to determine if the ACCESS TIMER has expired. If so, YES branch is take n to block 202 in FIG. 5 to repeat the scanning process.

if the ACCESS TIMER has not expired, NO branch is taken from decision block 243 to decision block 244 where a check is made to determine if a release has been received. If so, YES branch is taken to block 202 in FIG. 5 to repeat the scanning process. If a release has not been received, NO branch is take n from decision block 244 to decision block 245, where a check is made to determine if a directed re-try message has been received. A directed re-try message 1500 in FIG. 16 specifies up to six access-only channels of base sites 121-124 in X-system 102 in FIG. 1. If so, YES branch is taken to block 249 where the access-only channels in the directed re-try message are loaded in to the mobile's memory. Next, the mobile scans the access-only channels and tunes to the selected strongest access-only channel. Thereafter, program control returns to block 242.

If a directed re-try has not been received, NO branch is taken from decision block 245 to decision block 246, Where a check is made to determine if a voice channel has been assigned. If not, NO branch is taken back to decision block 222. If a voice channel has been assigned, YES branch is taken from decision block 246 to block 247 Where the registration information is updated in the mobile's memory 1400 (see FIG. 15). Next, at block 246, the mobile tunes to the assigned voice channel and connects the audio path.

Proceeding to decision block 251, a check is made to determine if a handoff message has been received A handoff message is sent to a mobile when it passes from on cell into another. If a handoff message has been received, YES branch is take n to block 250 where the audio path is opened Next, at block 246, the mobile tunes to the new voice channel received in the handoff message and re connects the audio path. If a handoff message is not received, NO branch is taken from decision block 251 to decision block 252, where a check is made to determine if the call has been completed. If not, NO branch is take n back to decision block 251. If the call has been completed, YES branch is taken from decision block 252 to block 253 where the audio is opened and a call complete message is sent by the mobile. Thereafter, the mobile returns to block 202 in FIG. 5 to repeat the scanning process.

Figure 7A:
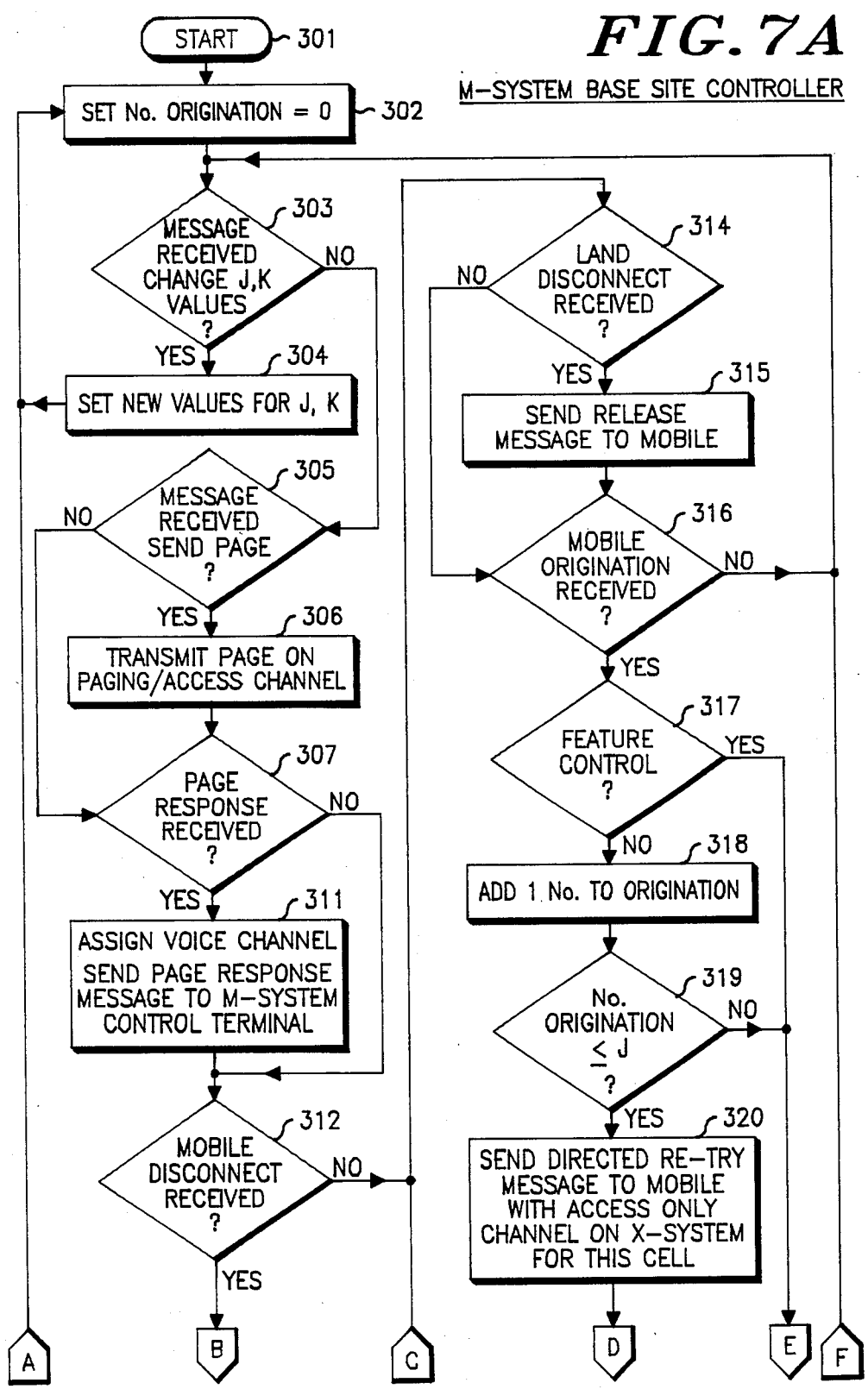
FIGS. 7A and 7B show a flow diagram executed by the M-system base site controllers in FIG. 1 for processing calls.
Figure 7B:
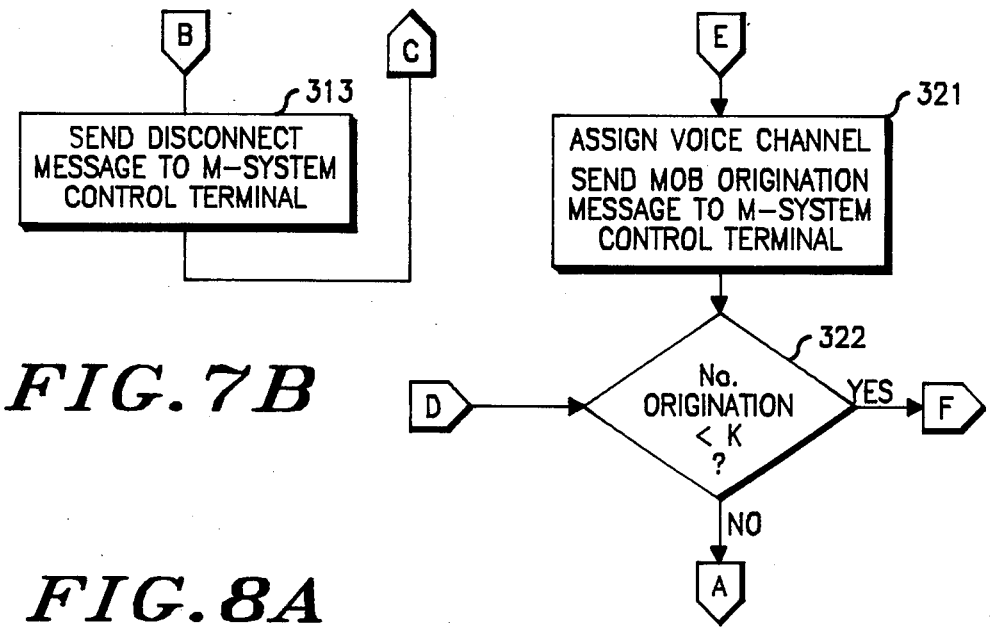

Referring to FIGS. 7A and 7B, there is illustrated a flow diagram executed by the M-system base site controllers in base sites 411-414 for processing calls in cellular systems 101 and 102. The process in FIG. 7A is entered at start block 301 and proceeds to block 302 where the number of originations is set to zero. Next, at decision block 303, a check is made to determine if a traffic control message for changing the values of J and K has been received from control terminal 420. If so, YES branch is taken to block 304 to set and store the new values of J and K. According to the present invention, the values of J and K may be dynamically varied to vary the percentage of calls that are directed from M-system 101 to X-system 102. If a traffic control message has not been received from control terminal 420, NO branch is taken to decision block 305.

At decision block 305, a check is made to determine if a control message has been received form control terminal 420 directing the BSC to send a page. If so, YES branch is take n to block 306, where a page is sent on the paging/access channel to the mobile identified in the paging control message. If a paging control message has not been received, No branch is taken from decision block 05 to decision block 307, where a check is made to determine if a page response has been received. If so, YES branch is taken to block 311, Where an available voice channel is assigned to the requesting mobile and a page response message is sent to M-system control terminal 420. If a page response has not been received, NO branch is taken from decision block 307 to decision block 312, where a check is made to determine if a mobile disconnect message had been received. If so yes branch is take n to block 313 in FIG. 7B, where a disconnect message is sent to M-system control terminal 420. If a mobile disconnect message has not been received, NO branch is taken from decision block 312 to decision block 314.

At decision block 314, a check is made to determine if a land disconnect message has been received. If so, YES branch is taken to block 315, where a release message is sent to the mobile identified in the land disconnect message. If a land disconnect message has not been received, NO branch is taken from decision block 314 to decision block 316, Where a check is made to determine if a mobile origination message has been received. If not, NO branch is taken to return to block 303. If a mobile origination message has been received, YES branch is taken to decision block 317, where a check is made to determine if the originating mobile has feature control. If so, YES branch is taken to block 321 to assign an available voice channel to the originating mobile and send a mobile origination message to M-system control terminal 420.

If the originating mobile does not have feature control, No branch is taken from decision block 317 to block 318 where one is added to the number of originations. Then, at decision block 319, the number of originations is compared to the value of J. If the number or originations is greater than J, NO branch is taken to block 321. If the number or originations is less than or equal to J, YES branch is taken to block 320, Where a directed re-try message is sent to the originating mobile. The directed re-try message 1500 in FIG. 16 includes the access-only channel on X-system 102 for the cell in which the BSC is located. Proceeding from either block 320 or block 321 to decision block 322, a check is made to determine if the number of originations is less than the value of K. According to the present invention, of the total number of K mobile originations, J originations are directed from M-system 101 to X-system 102 and K-J originations are processed by M-system 101. That is, the percentage of mobile originations directed from M-system 101 to X-system 102 is J/K percent. If the number of originations is less than K, YES branch is taken from decision block 322 to re turn to decision block 303 for processing the next call. If the number of originations is not less than K, No branch is taken from decision block 322 to return to start block 301 for setting the number of originations to zero and processing the next call Referring to FIGS. 8, 9 and 10, there are depicted the typical call flow scenarios which occur in the control terminal 420 of M-system 101 in FIG. 1. Control terminal 420 executes the call processing flow diagram in FIG. 8 for mobile and land originations, the flow diagram in FIG. 9 for mobile and land disconnects, and the flow diagram in FIG. 10 for mobile and land terminations. Conventional call flow scenarios together with related flow diagrams are shown and described in Motorola Instruction Manual No. 68P81150E06, entitled "DYNATAC Call Flow", published by Motorola Service publications, 1301 East Algonquin Road, Schaumburg, Ill., in 1983.

Figure 8A:
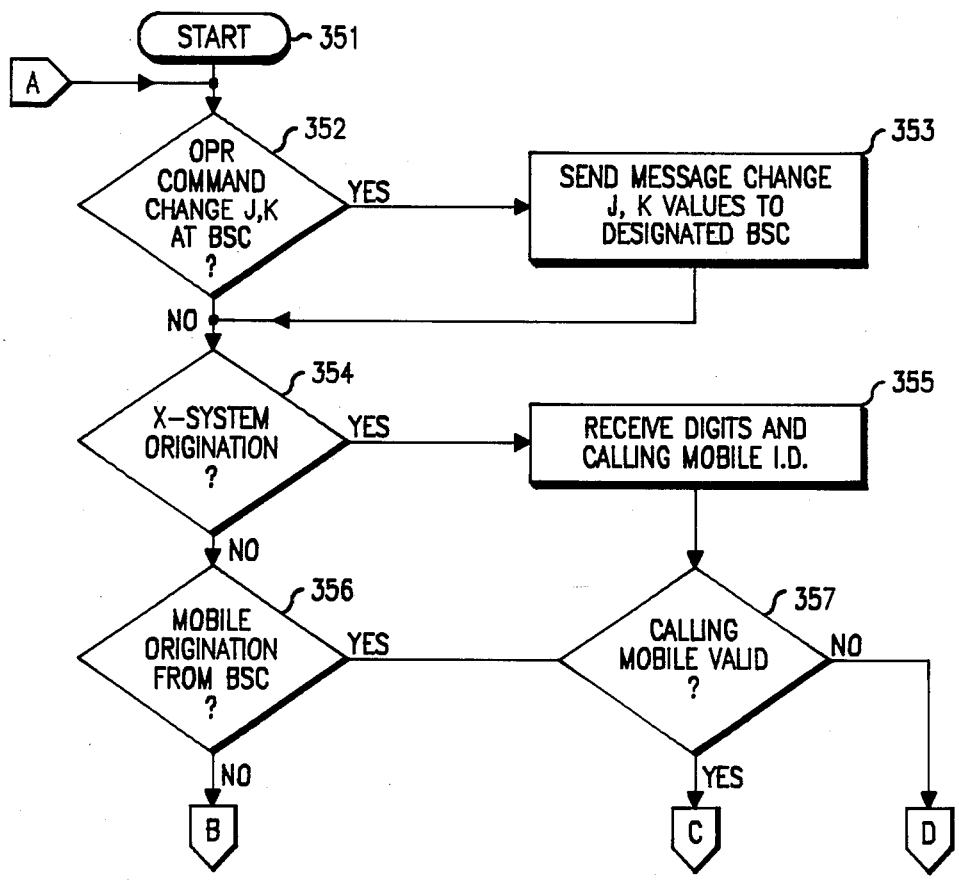
FIGS. 8A and 8B show a flow diagram executed by the M-system control terminal in FIG. 1 for processing calls.
Figure 8B:
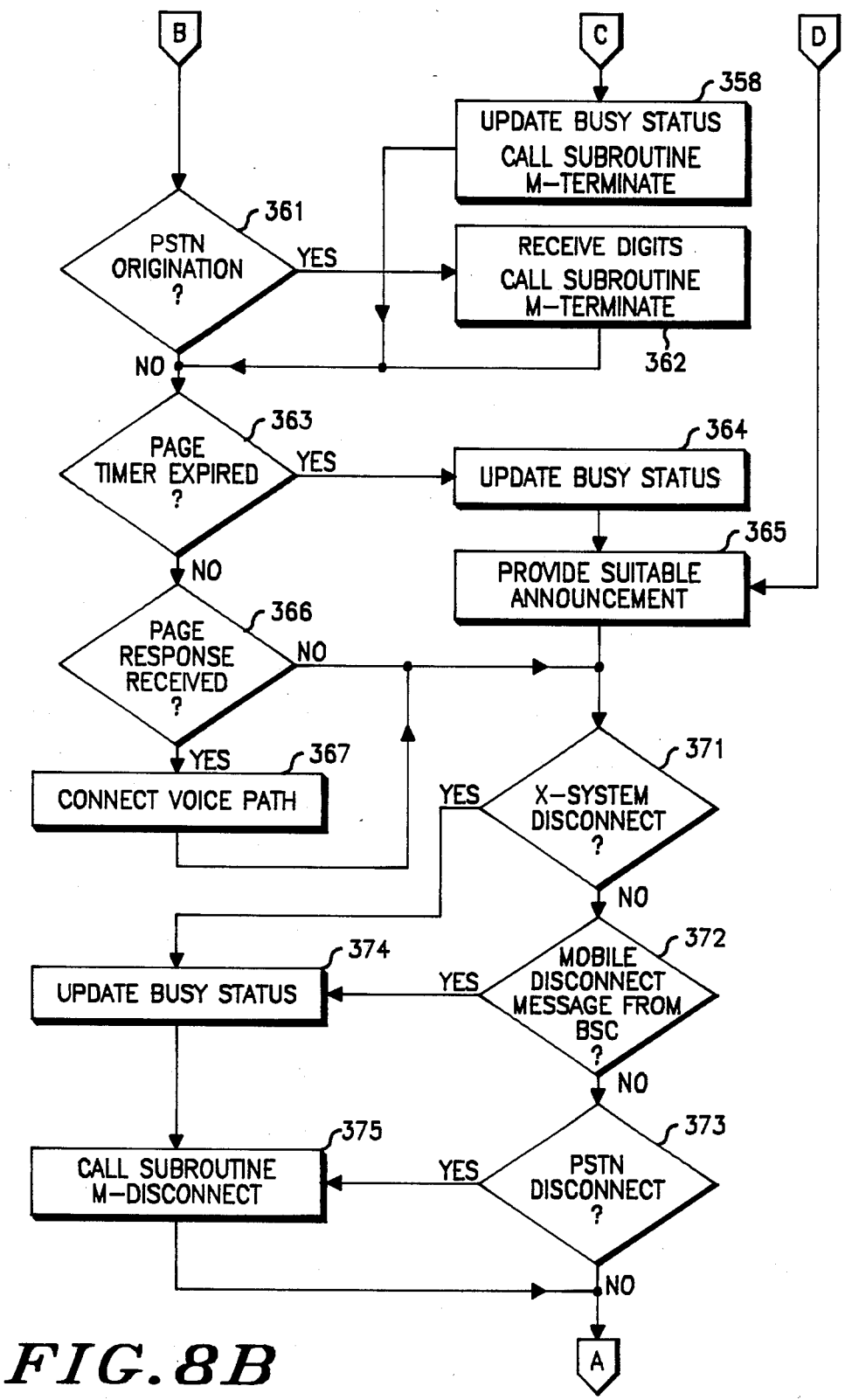

Referring to FIGS. 8A and 8B, there is illustrated a flow diagram executed by M-system control terminal 420 for processing calls in cellular systems 101 and 102 in FIG. 1. The process in FIG. 8A is entered at start block 351 and proceeds to block 352, where a check is made to determine if an operator command has been received directing that the values of J and K be changed at a particular BSC. If so, YES branch is to block 313 where a traffic control message is sent to the designated BSC for changing the values of J and K. According to the present invention, the value s of J and K may be dynamically varied for each BSC to vary the percentage of calls that are directed by each BSC from M-system 101 to X-system 102. If an operator command has not been received, NO branch is taken to decision block 354.

At decision block 354, a check is made to determine of an X-system origination has been received in an X-system origination, X-system control terminal 120 will seize an inter-office trunk 150 to control terminal 420 of M-system 101 in FIG. 1. Once the inter-office trunk 150 is seized, the X-system control terminal 120 will send M-system control terminal 420 the digits of the called telephone number and the calling mobile's identification number. If an X-system origination has not been received, NO branch is taken from decision block 354 to decision block 356, where a check is made to determine if a mobile origination has been received from a BSC. if so, YES branch is taken from decision block 356 to block 355.

Figure 10:
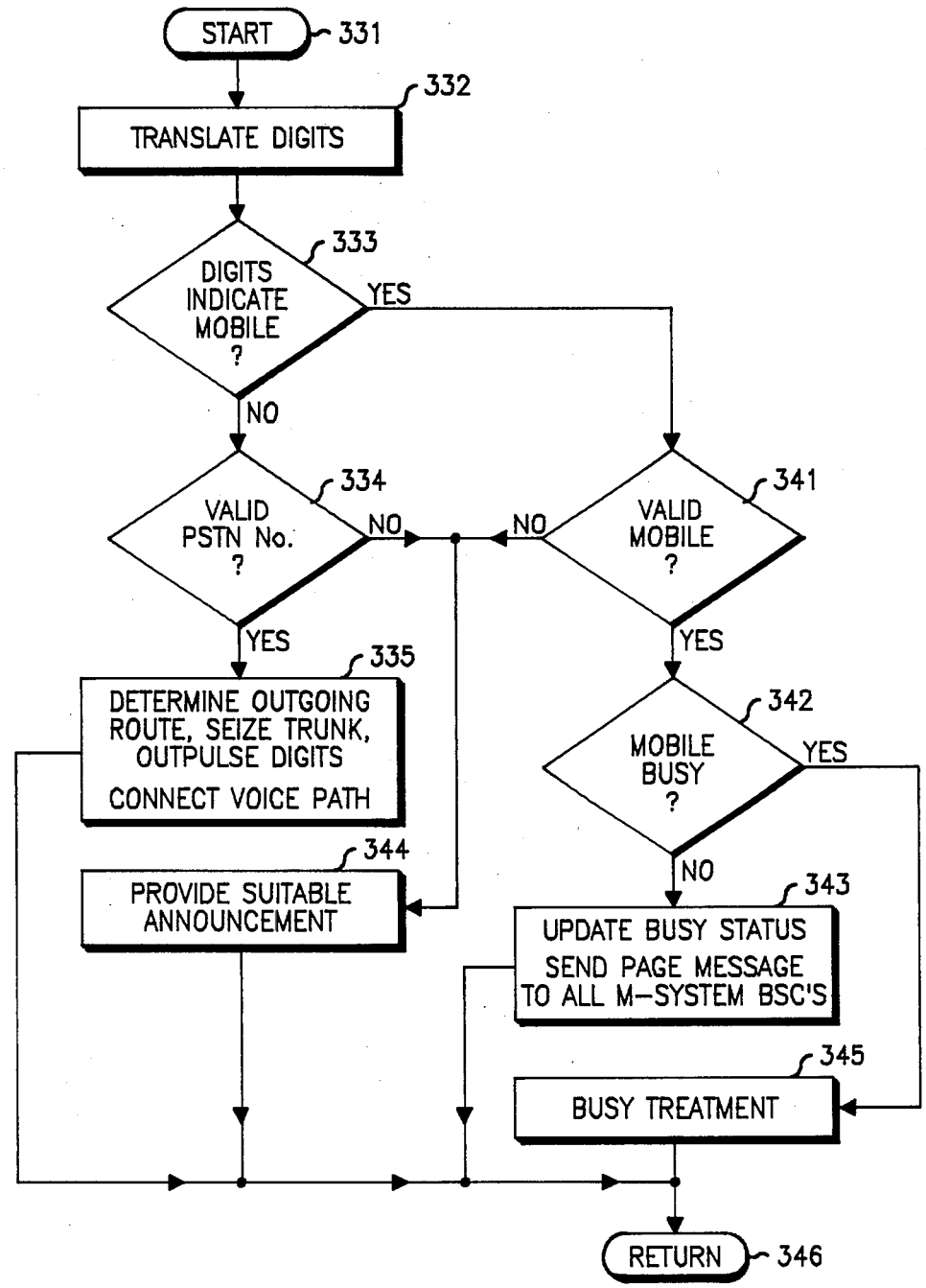
FIG. 10 shows a flow diagram executed by the M-system control terminal in FIG. 1 for terminating a call.

Program control proceeds both from decision block 356 and block 355 to decision block 357. Next, at decision block 355, a check is made to determine if the calling mobile's identification number is valid. M-system control terminal 420 accesses the subscriber data base 626 and/or the subscribe r data base 430 to determine if the calling mobile is a valid local mobile or a valid roaming mobile. If so, YES branch is taken to block 358 in FIG. 8B to update the busy status of calling mobile and the M-terminate subroutine in FIG. 10 is executed to terminate the call to the called telephone number. Thereafter program control proceeds to decision block 361. If the digits of the called telephone number and/or the calling mobile's identification number are not valid, NO branch is taken form decision block 357 to block 365 in FIG. 8B to provide a suitable announcement to the calling party.

Returning to decision block 356 in FIG. 8A, if a mobile origination has not been received from a BSC, NO branch is taken to decision block 361 in FIG. 8B. At decision block 361, a check is made to determine if a PSTN origination has been received In PSTN origination, telephone central office 110 of the public switch telephone network (PSTN) will seize an in trunk 157 to control terminal 420 of M-system 101 in FIG. 1. Once the trunk is seized, the PSTN will send cellular system 101 the desired mobile's telephone number. If a PSTN origination has been received, YES branch is taken to block 362 where the digits of the desired mobile's telephone number are received and the M-terminate subroutine in FIG. 10 is execute d to terminate the call to the called telephone number. Thereafter program control proceeds to decision block 363. At decision block 363, a check is made to determine if the PAGE TIMER has expired. If so, YES branch is taken to block 364 to update the busy status of the called mobile, and at block 365 to provide a suitable announcement to the calling party. If the PAGE TIMER has not expired, NO branch is taken to decision block 366 to determine if a page response message has been received. If so, YES branch is taken to block 367 where the voice path is connected. If a page response message has not been received, NO branch is taken from decision block 366 to decision block 371.

Program control proceeds both from decision block 366 and block 365 to decision block 371. Next, at decision block 371, a check is made to determine if an X-system disconnect has been received. If so, YES branch is taken to block 374 to update the busy status of called or calling mobile and, at block 375, to execute the M-disconnect subroutine in FIG. 9. Thereafter, program control returns to decision block 352 in FIG. 8A. If an X-system disconnect has not been received, NO branch is taken from decision block 371 to decision block 372, where a check is made to determine if a mobile disconnect message has been received from a BSC. If so, YES branch is take n to block 374 as explained hereinabove. If a mobile disconnect message has not been received, NO branch is take n from decision block 372 to decision block 373, where a check is made to determine if a PSTN disconnect has been received. If so, YES branch is take n to block 374 as explained hereinabove. If a PSTN disconnect has not been received, NO branch is taken form decision block 373 to return to decision block 352 in FIG. 8A.

Figure 9:
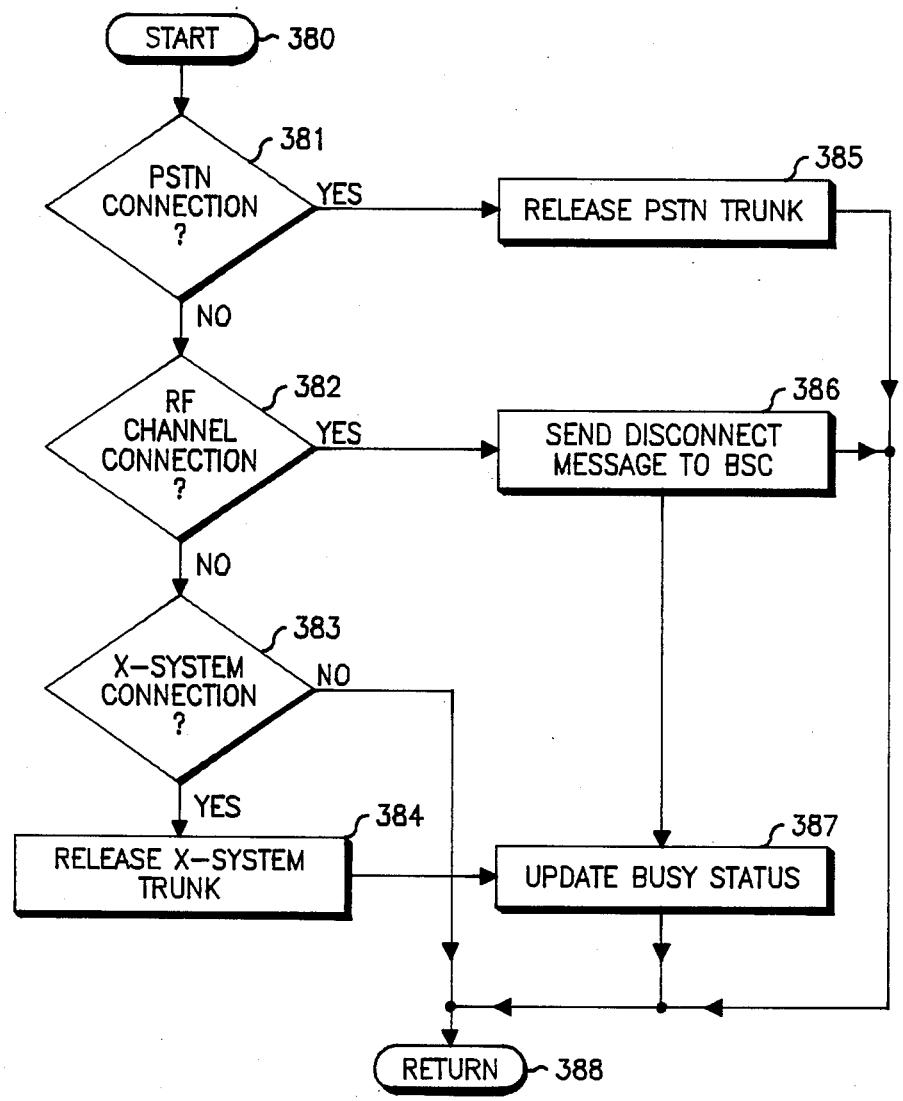
FIG. 9 shows a flow diagram executed by the M-system control terminal in FIG. 1 for disconnecting a call.

Referring to FIG. 9, there is illustrated a flow diagram executed by M-system control terminal 420 for disconnecting calls in cellular systems 101 and 102 in FIG. 1. The process in FIG. 9 is entered at start block 380 and proceeds to decision block 381, Where a check is made to determine if a PTSN connection is to be released. If so, YES branch is to block 385 where the PTSN trunk is released. Thereafter, program control returns to the flow diagram in FIG. 8 at return block 388. If no PTSN connections have been released, NO branch is taken from decision block 381 to decision block 382, where a check is made to determine if a voice channel connection is to be released. If so, YES branch is to block 386 where a disconnect message is sent to the BSC controlling the voice channel. Next, at block 387, the busy status of the released mobile is updated. Thereafter, program control returns to the flow diagram in FIG. 8 at return block 388. If no voice channel connections have been released, NO branch is taken from decision block 382 to decision block 383, where a check is made to determine if an X-system connection is to be released. If so, YES branch is to block 384 where the X-system trunk is released. Next, at block 387 the busy status of the released mobile is updated. Thereafter, program control returns to the flow diagraming FIG. 8 at return block 388. If no X-system connections are to be released, NO branch is taken from decision block 383 to re turn block 388 to re turn to the flow diagram in FIG. 8.

Referring to FIG. 10, there is illustrated a flow diagram executed by M-system control terminal 420 for terminating calls in cellular systems 101 and 102 in FIG. 1. The process in FIG. 10 is entered at start block 331 and proceeds to block 332, where the digits of the dialed telephone number are translated. Next, at decision block 333, a check is made to determine if the dialed digits indicate a mobile telephone number. If not, NO branch is taken to decision block 334, where a check is made to determine if the dialed digits indicate a valid PSTN telephone number. If not, NO branch is take n to block 344, where a suitable announcement is provided to the calling party. If the dialed digits indicate a valid PSTN telephone number, YES branch is taken from decision block 334 to block 335, where the outgoing route is determined, an out trunk 155 is seized and the dialed digits are outpulsed over the seized out trunk. Proceeding from both blocks 335 and 344, program control returns to the flow diagram of FIG. 8 at return block 346.

Returning to decision block 333, if the dialed digits indicate a mobile telephone number, YES branch is taken to decision block 341, where a check is made to determine if the dialed digits indicate a valid mobile telephone number. If not, NO branch is taken to block 344, where a suitable announcement is provided to the calling party. If the dialed digits indicate a valid mobile telephone number, YES branch is taken from decision block 341 to decision block 342, where a check is made to determine if the called mobile is busy. If so, YES branch is taken to block 245 Where a busy signal is provided to the calling party.

If the called mobile is not busy, NO branch is taken from decision bock 342 to block 343, where the busy status of the called mobile is updated and a page message is sent to all M-system BSC's to page the called mobile. At this point, the called mobile is paged throughout cellular systems 101 and 102. If mobile registration information is stored in the subscriber data base 626 or the subscribe r data base 430, the called mobile may first be paged in the cells near the cell in which the called mobile last registered. In paging the called mobile, M-system control terminal 420 will signal all or a selected group of its BSC's that a call is waiting for the called mobile. Each signalled BSC will generate and send a paging message on the paging/access channel to the called mobile to inform it that a call awaits.

Figure 11:
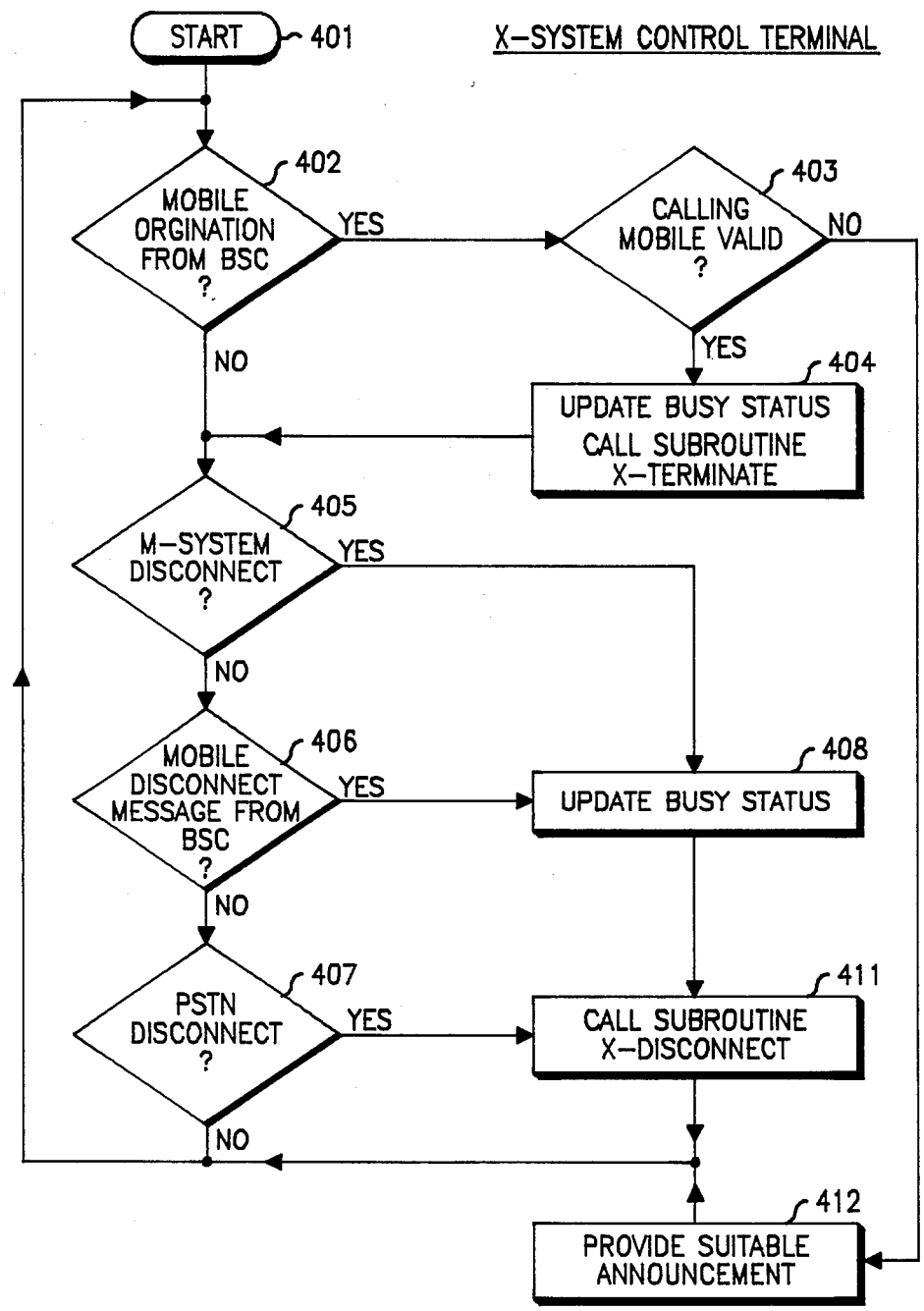
FIG. 11 shows a flow diagram executed by the X-system control terminal in FIG. 1 for processing calls.
Figure 12:
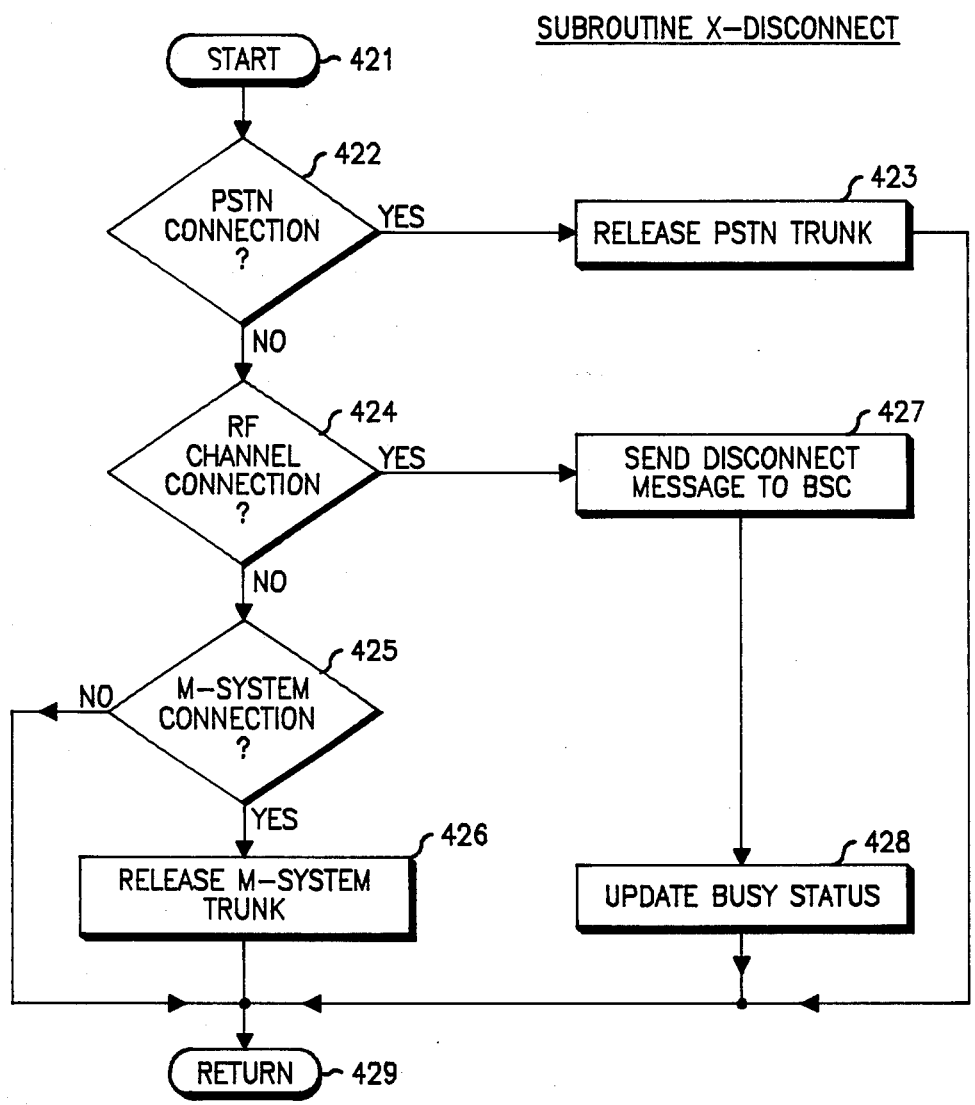
FIG. 12 shows a flow diagram executed by the X-system control terminal in FIG. 1 for disconnecting a call.
Figure 13:
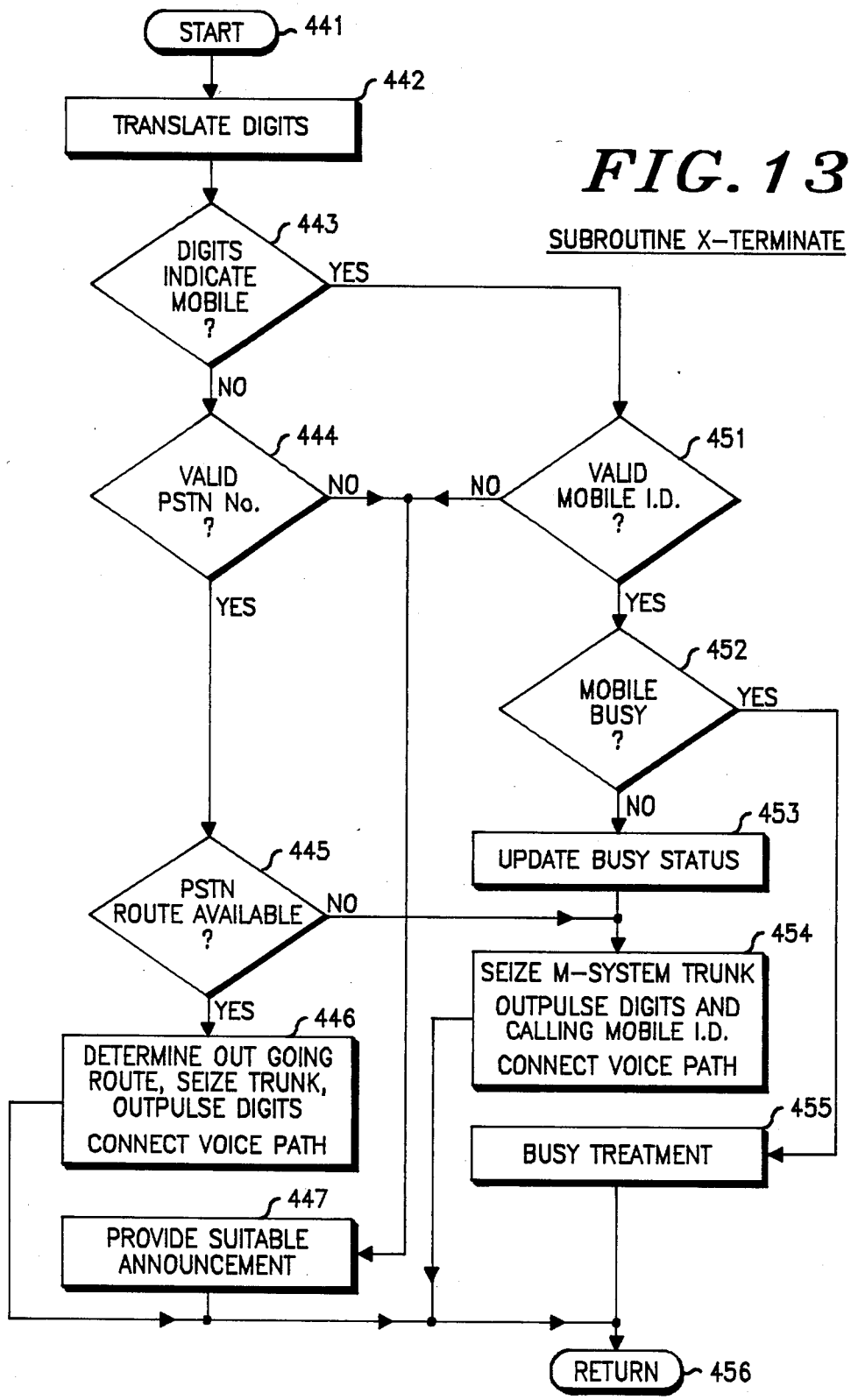
FIG. 13 shows a flow diagram executed by the X-system control terminal in FIG. 1 for terminating a call.

Upon receiving the page, the called mobile will rescan the paging/access channels to determine which is the strongest as was described hereinabove with respect to FIGS. 5 and 6. This insures that the mobile will signal in on the best available paging/access channel. Once the strongest paging/access channel is determined, the mobile acknowledges the paging message by transmitting an acknowledgement message on the paging/access channel. The mobile's acknowledgement message is forwarded by the BSC to M-system control terminal 420 over the data line connecting M-system control terminal 420 and the BSC (see FIG. 2). Note that only one BSC will return the mobile's acknowledgement message to M-system control terminal 420. Therefore, M-system control terminal 420 knows the cell in which the mobile is located. Once the called mobile has acknowledged the page, the conversation state may then be entered. Proceeding from both blocks 343 and 345, program control returns to the flow diagram of FIG. 8 at return block 346. Referring to FIGS. 11, 12 and 13, there are depicted the typical call flow scenarios which occur in the control terminal 120 of X-system 102 in FIG. 1. Control terminal 120 executes the call processing flow diagram in FIG. 11 for mobile and land originations, the flow diagram in FIG. 12 for mobile and land disconnects, and the flow diagram in FIG. 13 for mobile and land terminations.

Referring to FIG. 11, there is illustrated a flow diagram executed by X-system control terminal 120 for processing calls in cellular systems 101 and 102 in FIG. 1. The process in FIG. 11 is entered at start block 401 and proceeds to decision block 402, where a check is made to determine if a mobile origination has been received from a BSC. If so, YES branch is taken from decision block 402 to decision block 403, a check is made to determine if the calling mobile's identification number; valid. If so, YES branch is taken to block 404 to update the busy status of calling mobile and the X-terminate subroutine in FIG. 13 is executed to terminate the call to the called telephone number. Thereafter program control proceeds to decision block 405. If the digits of the called telephone number and/or the calling mobile's identification number are not valid, NO branch is taken form decision block 403 to block 412 to provide a suitable announcement to the mobile. Thereafter, program control returns to decision block 402.

Returning to decision block 402, if a mobile origination has not been received from a BSC, NO branch is taken to decision block 405. At decision block 405, a check is made to determine if an M-system disconnect has been received if so, Yes branch is taken to block 408 to update the busy status to indicate that the indicated mobile is no longer busy. Then, at block 411, the X-disconnect subroutine in FIG. 12 is executed to disconnect the call. Thereafter, program control returns to decision block 402. If an M-system disconnect has not be en received, NO branch is taken from decision block 405 to decision block 406, where a check is made to determine if a mobile disconnect has been received form a BSC. If so, Yes branch is taken to block 408 to update the busy status to indicate that the indicated mobile is no longer busy. Then, at block 411, the X-disconnect subroutine in FIG. 12 is executed to disconnect the call. Thereafter, program control returns to decision block 402. If a mobile disconnect has not been received, NO branch is taken from decision block 406 to decision block 407, where a check is made to determine if a PSTN disconnect has been received. If so, Yes branch is taken to block 411, Where the X-disconnect subroutine in FIG. 12 is executed to disconnect the call. If a PSTN disconnect has not been received, No branch is taken form decision block 407 to return to decision block 402.

Referring to FIG. 12, there is illustrated a flow diagram executed by X-system control terminal 120 for disconnecting calls in cellular systems 101 and 102 in FIG. 1. The process in FIG. 12 is entered at start block 421 and proceeds to decision block 422, where a check is made to determine if a PTSN connection is to be released. If so, YES branch is to block 423 Where the PTSN trunk is released. Thereafter, program control returns to the flow diagram in FIG. 8 at return block 429. If no PTSN connections have been released, NO branch is taken from decision block 422 to decision block 424, Where a check is made to determine if a voice channel connection is to be released. If so, YES branch is to block 427 where a disconnect message is sent to the BSC controlling the voice channel. Next, at block 428, 5 the busy status of the released mobile is updated. Thereafter, program control returns to the flow diagram in FIG. 8 at return block 429. If no voice channel connections have been released, NO branch is taken from decision block 424 to decision block 425, where a check 10 is made to determine if an M-system connections is to be released. If so, YES branch is to block 426 where the M-system trunk is released. If no M-system connections have been released, NO branch is taken from decision block 425 to re turn block 429 to re turn to the flow diagram in FIG. 11.

Referring to FIG. 13, thee is illustrated a flow diagram executed by X-system control terminal 120 for terminating calls in cellular systems 101 and 102 in FIG. 1. The process in FIG. 13 is entered at start 20 block 441 and proceeds to decision block 442, where the digits of the dialed telephone number are translated. Next, at decision block 443, a check is made to determine if the dialed digits indicate a mobile telephone number. If not, NO branch is taken to decision block 444, where a check is made to determine if the dialed digits indicate a valid PSTN telephone number. If not, NO branch is taken to block 447, where a suitable announcement is provide d to the calling party. Thereafter, program control re turns to the flow diagram of FIG. 11 at return block 456.

If the dialed digits indicate a valid PSTN telephone number, YES branch is take n from decision block 443 to decision block 445, where a check is made to determine if a PSTN route is available. In the preferred embodiment of the present invention, out trunks 159 in FIG. 1 are not present. If out trunks 159 are not present, no branch is taken from decision block 422 to block 454 to proceed as described hereinbelow. If out trunks 159 are present, YES branch is taken from decision block 445 to block 446, where the outgoing route is determined, an out trunk 159 is seize d and the dialed digits are outpulsed over the seized out trunk. Thereafter, program control returns to the flow diagram of FIG. 11 at return block 456.

Returning to decision block 443, if the dialed digits indicate a mobile telephone number, YES branch is taken to decision block 451, where a check is made to determine if the dialed digits indicate a valid mobile telephone number. If not, NO branch is taken to block 447, where a suitable announcement is provided to the calling party. Thereafter, program control returns to the flow diagram of FIG. 11 at return block 456. If the dialed digits indicate a valid mobile telephone number, YES branch is taken from decision block 451 to decision block 452, where a check is made to determine if the called mobile is busy. If so, YES branch is taken to block 455 where a busy signal is provide d to the calling party. If the called mobile is not busy, NO branch is taken from decision block 452 to block 453, where the busy status of the called mobile is updated. Next, at block 454, an inter-office trunk 150 to M-system is seized, and the dialed digits and mobile identification number are outpulsed on the seized inter-office trunk.

The flow diagrams in FIGS. 5, 6, 7, 8, 9, 10, 11, 12 and 13 provide a detailed description of the process steps executed by the corresponding processing circuitry of the X-system and M-system. By way of analogy to an electrical circuit diagram, these flow diagrams are equivalent to a detailed schematic for an electrical circuit where provision of the circuitry for electrical circuit locks corresponds to provision of actual computer instructions for the flow diagram blocks. Thus, the coding of the process steps of these flow diagrams into instructions of suitable commercially available computers is a mere mechanical step for a routineer skilled in the programming art.

In summary, an improved method and apparatus has been illustrated and described for interconnecting cellular systems covering the same geographical area in order to accommodate cellular system growth. By utilizing the present invention, the radiotelephone traffic load may be shared between an existing cellular system and another cellular system colocated therewith for covering the same geographical area. Therefore, while a particular embodiment of the present invention has been shown and described, it should be understood that the present invention is not limited thereto since other embodiments may be made by those skilled in the art without departing from the true spirit and scope of the present invention. It is thus contemplated that the present invention encompasses any and all such embodiments covered by the following claims.

We claim:

1. A method of processing radiotelephone calls in at least first and second radiotelephone systems and a central office for providing telephone service to radiotelephones located in a geographical area, said geographical area divided into a plurality of cells, each cell assigned a plurality of voice radio channels, at least one paging/access radio channel and/or at least one access-only radio channel which differ from those radio channels assigned to adjoining cells, aid first radiotelephone system including a plurality of out trunks, a plurality of inter-office trunks and a plurality of fixed site radio apparatus each located in a different cell for communicating with said radiotelephones, and said second radiotelephone system including a plurality of in trunks, a plurality of out trunks, a plurality of inter-office trunks and a plurality of fixed site radio apparatus each located in a different cell for communicating with said radiotelephones, said method comprising the steps of:

coupling out trunks of said first radiotelephone system to the central office;

coupling in trunks and out trunks of said second radiotelephone system to the central office;

coupling interoffice trunks of said first radiotelephone system to inter-office trunks of said second radiotelephone system;

locating each fixed site radio apparatus of said second radiotelephone system with the fixed site radio apparatus of said first radiotelephone system in the same cell;

assigning for each cell at least one access-only radio channel and at least one of the plurality of voice radio channels for the cell to the fixed site radio apparatus of said first radiotelephone system located in the cell, and at least one paging/access radio channel and at least one of the plurality of voice radio channels for the cell to the fixed site radio apparatus of said second radiotelephone system located in the cell; and directing a predetermined percentage of telephone calls originated by radiotelephones from said second radiotelephone system to said first radiotelephone system.

2. The method according to claim 1, wherein new cells are added for expanding the geographical area and where in said locating step further includes the step of locating fixed site radio apparatus of said second radiotelephone system in each new cell.

3. The method according to claim 1, wherein each originating radiotelephone sends a dialed telephone number and said directing step further includes, at said first radiotelephone system, the steps of:

receiving a request for a voice channel form an originating radiotelephone;

assigning a voice radio channel to said originating radiotelephone; and terminating said originating radiotelephone to an available one of the out trunks of said first radiotelephone system or inter-office trunks of said first radiotelephone system.

4. The method according to claim 1, wherein said directing step further includes the step of sending a directed retry message to said originating radiotelephone.

5. The method according to claim 1, further including the steps of:

receiving a telephone number of a radiotelephone from one of said in trunks; and paging the radiotelephone having the received telephone number on the paging/access channels of each cell.

6. The method according to claim 1, wherein said radiotelephones transmit a page response message in response to receiving a paging message, and said paging step includes the step of sending a paging message to the the radiotelephone having the received telephone number, said method further including the steps of:

receiving a page response message from said paged radiotelephone; and sending a voice channel assignment message to said paged radiotelephone if a page response message is received.

7. A method of processing radiotelephone calls in at least first and second radiotelephone systems and a central office for providing telephone service to radiotelephone s locate d in a geographical area, said geographical area divided into a plurality of cells, each cell assigned a plurality of voice radio channels, at least one paging/access radio channel and/or at least one access-only radio channel which differ from those radio channels assigned to adjoining cells, said first radiotelephone system including a plurality of inter-office trunks and a plurality of fixed site radio apparatus each located in a different cell for communicating with said radiotelephones, and said second radiotelephone system including a plurality of in trunks, a plurality of out trunks, a plurality of inter-office trunks and a plurality of fixed site radio apparatus each located in a different cell for communicating with said radiotelephones, said method comprising the steps of:

coupling in trunks and out trunks of said second radiotelephone system to the central office;

coupling inter-office trunks of said first radiotelephone system to inter-office trunks of said second radiotelephone system;

locating each fixed site radio apparatus of said second radiotelephone system with the fixed site radio apparatus of said first radiotelephone system in the same cell;

assigning for each cell at least one access-only radio channel and at least one of the plurality of voice radio channel for the cell to the fixed site radio apparatus of said first radiotelephone system located in the cell, and at least one the paging/access radio channel and at least one of the plurality of voice radio channels for the cell to the fixed site radio apparatus of said second radiotelephone system located in the cell; and directing a predetermined percentage of telephone calls originated by radiotelephone s from said second radiotelephone system to said first radiotelephone system.

8. The method according to claim 7, wherein new cells are added for expanding the geographical area, and wherein said locating step further includes the step of locating fixed site radio apparatus of said second radiotelephone system in each new cell.

9. The method according to claim 7, wherein each originating radiotelephone sends a dialed telephone number and said directing step further includes, at said first radiotelephone system, the steps of:

receiving a request for a voice channel form an originating radiotelephone;

assigning a voice radio channel to said originating radiotelephone; and terminating said originating radiotelephone to an available one of the inter-office trunks of said first radiotelephone system.

10. The method according to claim 7, wherein said directing step further includes the step of sending a directed retry message to said originating radiotelephone.

11. The method according to claim 7, further including the steps of:

receiving a telephone number of a radiotelephone from one of said in trunks; and paging the radiotelephone having the received telephone number on the paging/access channels of each cell.

12. The method according to claim 7, wherein said radiotelephones transmit a page response message in response to receiving a paging message, and said paging step includes the step of sending a paging message to the the radiotelephone having the received telephone number, said method further including the steps of:

receiving a page response message from said paged radiotelephone; and sending a voice channel assignment message to said paged radiotelephone if a page response message is received.

13. A communications system coupled to a central office for processing radiotelephone calls, comprising, in combination:

first and second radiotelephone systems for providing telephone service to radiotelephones located in a geographical area, said geographical area divided into a plurality of cells, each cell assigned a plurality of voice radio channels, at least one paging/access radio channel and/or at least one access-only radio channel which differ from those radio channels assigned to adjoining cells;

said first radiotelephone system including:

a plurality of inter-office trunks; and a plurality of fixed site radio apparatus each located in a different cell for communicating with said radiotelephones, each fixed site radio apparatus of said first radiotelephone system being assigned at least one access-only radio channel and at least two of the plurality of voice radio channels for the cell in which it is located;

said second radiotelephone system including;

a plurality of in trunks and a plurality of out trunks coupled to the central office;

a plurality of inter-office trunks coupled to inter-office trunks of said first radiotelephone system; and a plurality of fixed site radio apparatus each located in a different cell for communicating with said radiotelephones, each fixed site radio apparatus of said second radiotelephone system being assigned at least one paging/access radio channel and at least two of the plurality of voice radio channels for the cell in which it is located, and each fixed site radio apparatus of said first radiotelephone system being located with the fixed site radio apparatus of said second radiotelephone system in the same cell.

* * * * *